US006854072B1

(12) United States Patent
Cagle et al.

(10) Patent No.: US 6,854,072 B1
(45) Date of Patent: Feb. 8, 2005

(54) HIGH AVAILABILITY FILE SERVER FOR PROVIDING TRANSPARENT ACCESS TO ALL DATA BEFORE AND AFTER COMPONENT FAILOVER

(75) Inventors: Robert Penn Cagle, Claremont, CA (US); Patrick J. McEvoy, Palo Alto, CA (US); Kevin Sean Sheehan, Sunnyvale, CA (US)

(73) Assignee: Continuous Computing Corporation, San Diego, CA (US)

( * ) Notice: Subject to any disclaimer, the term of this patent is extended or adjusted under 35 U.S.C. 154(b) by 793 days.

(21) Appl. No.: 09/874,249

(22) Filed: Jun. 6, 2001

Related U.S. Application Data

(63) Continuation-in-part of application No. 09/688,859, filed on Oct. 17, 2000.

(51) Int. Cl.[7] ............................ G06F 11/00; G06F 15/16
(52) U.S. Cl. ................................ 714/15; 714/1; 714/6; 709/203
(58) Field of Search ........................... 714/1, 6, 11, 15; 709/203

(56) References Cited

U.S. PATENT DOCUMENTS

| | | | |
|---|---|---|---|
| 4,412,281 A | 10/1983 | Works .......................... 364/200 |
| 4,710,926 A | 12/1987 | Brown et al. ................... 371/9 |
| 4,967,344 A | 10/1990 | Scavezze et al. ............ 364/200 |
| 5,345,566 A | 9/1994 | Tanji et al. .................... 395/325 |
| 5,404,465 A | 4/1995 | Novakovich et al. ........ 395/325 |
| 5,513,314 A | 4/1996 | Kandasamy et al. ... 395/182.04 |
| 5,713,017 A * | 1/1998 | Lin et al. ........................ 707/8 |
| 5,737,514 A | 4/1998 | Stiffler ..................... 395/182.11 |
| 5,784,547 A | 7/1998 | Dittmar et al. ......... 395/182.02 |
| 5,796,934 A * | 8/1998 | Bhanot et al. .................. 714/4 |
| 5,805,785 A | 9/1998 | Dias et al. .............. 395/182.02 |
| 5,822,512 A | 10/1998 | Goodrum et al. ....... 395/182.11 |
| 5,852,724 A | 12/1998 | Glenn, II et al. ........ 395/200.69 |
| 5,968,185 A | 10/1999 | Bressoud et al. .............. 714/10 |
| 6,035,412 A | 3/2000 | Tamer et al. ................... 714/6 |
| 6,052,797 A | 4/2000 | Ofek et al. ..................... 714/6 |
| 6,070,191 A * | 5/2000 | Narendran et al. .......... 709/226 |
| 6,092,214 A | 7/2000 | Quoc et al. ..................... 714/4 |
| 6,092,218 A | 7/2000 | Liddell et al. ................. 714/11 |
| 6,108,300 A * | 8/2000 | Coile et al. .................. 370/217 |
| 6,185,695 B1 * | 2/2001 | Murphy et al. ................. 714/4 |
| 6,247,141 B1 * | 6/2001 | Holmberg ....................... 714/2 |
| 6,249,879 B1 * | 6/2001 | Walker et al. ................. 714/11 |
| 6,490,610 B1 * | 12/2002 | Rizvi et al. .................. 718/101 |
| 6,594,776 B1 * | 7/2003 | Karighattam et al. .......... 714/4 |

OTHER PUBLICATIONS

W.Baker, R. Horst, D.Sonnier and W. Watson; "A Flexible ServerNet–based Fault–Tolerant Architecture"; 1995 IEEE.

Delphion Intellectual Property Network website; "Bus Architecture for Passive Fault–Tolerant Command/Response System"; Aug. 1986.

Delphion Intellectual Property Network website; "Method for Improving Network Availability with Redundant Network Servers"; Aug. 1996.

Y. Liu, F. Yang and J. Chen; "A Two–Level Strategy for Software Fault Tolerance of Service Control Point"; 1998 IEEE.

M. Gouda and T. McGuire; "Accelerated Heartbeat Protocols"; 1998 IEEE.

(List continued on next page.)

*Primary Examiner*—Krisna Lim
(74) *Attorney, Agent, or Firm*—Morgan, Lewis & Bockius LLP

(57) ABSTRACT

A system and method for providing highly available and/or fault tolerant servers by implementing a lookup table or other data structure that allows a common file handle to be generated and interpreted by any component server of the HA server, thereby preventing stale file handles and removing local file system requirements as to media, implementation, and location.

24 Claims, 27 Drawing Sheets

OTHER PUBLICATIONS

T.Nakamikawa, Y. Morita, S. Yamaguchi, S. Ishikawa and Y. Miyazak; "High Performance Fault Tolerant Computer and its Fault Recovery"; 1997 IEEE.

H.Kuefner and H. Baehring; "Dynamic Fault Tolerance in DCMA—A Dynamically Configurable Multi computer Architecture"; 1996 IEEE.

A. Nayak, W. Jone and S. Das; "Designing General-Purpose Fault-Tolerant Distributed System—A Layered Approach"; 1994 IEEE.

B. Benton, H.Kokado and H. Yamada; "A Fault-Tolerant Implementation of the CTRON Basic Operating System"; 1994 IEEE.

W. David Shambroom; "Use of Protocol Validation and Verification Techniques in the Design of a Fault-Tolerant Computer Architecture"; 1993 IEEE.

L. Strigini and F. Di Giandomenico; "Flexible Schemes for Application-Level Fault Tolerance"; 1991 IEEE.

B. Butler and S. Adams; "A Fault-Tolerant Network Architecture for Integrated Avionics"; 1991 IEEE.

Jean-Claude Laprie, Jean Arlat, Christian Beounes and Karama Kanoun; "Definition and Analysis of Hardware-and Software-Fault-Tolerant Architectures"; Jul. 1990 IEEE.

F.Cristian; B. Dancey and J. Dehn; "Fault-Tolerance in the Advanced Automation System"; 1990 IEEE.

S. Bagchi, B. Srinivasan, K. Whisnant, Z. Kalbarczyk and R. Iyer; "Hierarchical Error Detection in a Software Implemented Fault Tolerance (SIFT) Environment", 2000 IEEE.

Flavin Cristian; "Understanding Fault-Tolerant Distributed System"; Communictions of the Ages, Feb. 1991/vol. 34/No. 2.

Daniel P. Siewiorek/Carnegie Mellon University; "Fault Tolerance in Commercial Computer"; 1990 IEEE.

Philip A. Bernstein; "Sequoia: A Fault-Tolerant Tightly Coupled MultiProcessor for Transaction Processing"; Feb. 1988 IEEE.

Wang Qian et al, "Fault—Tolerant Computer System for STD", Mini-Micro Systems, vol. 16, No. 11, Nov. 1995.

David Guest, "The foolproof computer", Computer Systems Europe Dec. 1988.

V. A. Bogatyrev, "Estimating the Reliability of Functionally Redundant Multicomputer Systems with Their Reconfiguration on the Basis of Function Reallocation", Engineering Simulation, 1995, vol. 12, pp. 318–322.

Se Hwa Park et al., "A Study on the Implementation of a Control System with Dual Structure and Its Reliability Analysis", Dept. of Electrical Eng., KAIST, 1990.

Tetsuo Sakuma et al., OKITRON-II: Fault-Tolerant Telecom Computer, OKI Technical Review 156 vol. 62, Jul. 1996.

V. A. Bogatyrev, "On The Dynamic Distribution of Intercomputer Communication Requests in Multicomputer Systems with Redundant Buses", Engineering Simulation, 11(2), 1993, pp. 234–240.

J. C. Chenavas et al., "Architecture Des Systems De Conduite A Haute Disponihilite".

Aguilera et al., "Heartbeat: A Timeout-Free Failure Detector for Quiescent Reliable Communication", 1977.

Peter Ruber "How Much Server Fault", 1998.

* cited by examiner

HIGH AVAILABILITY FILE SERVER FOR PROVIDING TRANSPARENT ACCESS TO ALL DATA BEFORE AND AFTER COMPONENT FAILOVER

REFERENCE TO RELATED APPLICATIONS

This application is a continuation-in-part to application Ser. No. 09/688,859 filed Oct. 17, 2000.

BACKGROUND OF THE INVENTION

1. Field of the Invention

The present invention relates to telecom/datacom computer systems. More particularly, the present invention relates to a system and method for providing high availability to telecom/datacom computer systems.

2. Description of the Related Art

Providing fault tolerance to high availability systems typically involves providing redundant configuration and application data, redundant communication between control nodes and processing nodes, redundant control nodes, and a dynamically assignable pool of processing resources. In traditional high availability systems, providing fault tolerance is often accomplished by replicating the system components to remove single points of failure within the system. FIG. 1 shows a 2N-redundant platform composed of a primary node 10 and an identical backup node 20 that will provide service if the primary 10 fails. Such a solution is fairly easy to implement both in terms of design and the software that must be used to manage it, but can be prohibitively expensive as every component must be duplicated.

Furthermore, such a design carries a more significant drawback in that when the primary node fails all calls in process are dropped. This failure occurs even if the backup node comes up quickly. In some applications, such as voicemail, this is acceptable, as a user can simply call back to replay the messages. However, when a user who is attempting to manage a Wall Street conference call with 200 analyst participants, such a situation results in an enormous inconvenience and lost revenue.

Another approach to providing high availability systems has been the duplication of subsets of hardware instead of the entire node, as shown in FIG. 2. Most often, this translates to duplication of the CPU 120. Should the primary CPU 120-1 fail, the backup 120-2 awakens from standby and begins to provide service. This design addresses the cost issues that arise when compared to the 2N Redundant architecture since not all of the hardware in a given node need be replicated. However, while this architecture is less expensive to implement, the software challenges for such a platform are formidable. Should the primary CPU 120-1 fail and the backup 120-2 take over its function, the backup 120-2 must accurately determine the state and take control of all of the I/O cards—all without disturbing the state of the cards or the calls in process at the time of failure. Most operating systems cannot survive a hardware failure, so any fault takes down the whole system. To get around this, conventional systems must use hardened operating systems, hardened device drivers, and even hardened applications to protect against the failure of an I/O processor or any peripheral. Another consideration is the immaturity of such systems and the lack of standardization. Furthermore, the conventional system bus (e.g., PCI or CompactPCI) remains a single point of failure. A single misbehaving I/O card can take down the entire system much like a single bulb in a string of Christmas lights.

As computer networks become increasingly important, a particular need arises with regard to fault tolerant or highly available (collectively, "HA") network file services. In addition to redundant component servers, redundant copies of all data on separate media, and redundant network connections, a HA file server needs management software sophisticated enough to make two or more component servers act like a single server so that any failover from one server to another is transparent to the users or clients. While several network file server standards exist, such as NFS for Unix and Linux computers, CIFS for Window computers, and AFS for Apple Macintosh computers, none of the available standards is inherently fault tolerant or highly available.

Existing systems provide the redundant data copies using periodic or real-time backup, disk mirroring, cluster file systems, and/or file system replicators. In the event of a component failure, the backup and disk mirroring schemes generally require time and operator intervention and accordingly are unsuitable for HA file servers. Attempts to build HA file servers on top of disk mirroring have suffered from several drawbacks to include data loss, maintenance of the standby file system in only a partially consistent state, and the need to use essentially identical media in the primary and standby systems. Similarly, attempts to build HA file servers on top of cluster file systems and file system replicators have also met with difficulties. In a cluster file system, redundant servers have direct access to the same media, usually via dual-ported disks using shared SCSI chains or shared fiber channel chains; the shared media and chains injecting single points of failure within these systems and restricting the physical location of the associated servers. File system replicators generate errors on the client systems and/or require action to be taken by the client computer in the event of failure and therefore fail to provide the transparent failover required for HA systems.

In addition to system failures, inefficiencies within the system are also of concern. For example, each processor in the system has an IP address. Manually setting the IP address of each processor makes the site install process time consuming and error prone. Existing mechanisms for automatically setting the IP address do not take into account geographic location or board replacement. Existing mechanisms for automatically assigning IP addresses, such as the Dynamic Host Configuration Protocol (DHCP) or Reverse Address Resolution Protocol (RARP), rely on a unique hardware address permanently programmed into all computer hardware. This address moves with the hardware, so maintaining a specific IP address for a specific computer location is impossible, given that all hardware will move and/or be replaced at some point in time.

SUMMARY OF THE INVENTION

The present invention has been made in view of the above circumstances and has an object to provide a cost effective system and method for providing high availability and improved efficiency to telecom/datacom systems. Further objects of the present invention are to provide a system and method that can simplify the programming necessary to implement high availability successfully, avoid potential problems caused by fluid standards, allay concerns brought up by single points of failure of busses, and leverage open standards and the increasingly intelligent I/O cards and peripheral processors that have become available. Other objects of the present invention are to provide an HA file server that has no single point of failure, does not require the components to be physically near each other, does not require the component servers or their local file systems to be identical or even similar, and provides transparent access to all data before and after a component failover with no action required by client systems. Additional objects and advantages of the invention will be set forth in part in the description that follows, and in part will be apparent from the description, or may be learned by practice of the invention. The objects and advantages of the invention will be realized by means of the elements and combinations particularly pointed out in written description and claims hereof as well as the appended drawings.

It should be understood that both the foregoing general description and the following detailed description are exemplary and explanatory only and are not restrictive of the invention as claimed. It will be apparent to those skilled in the art that various modifications and variations can be made without departing from the scope or spirit of the invention.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION

Figure 1:
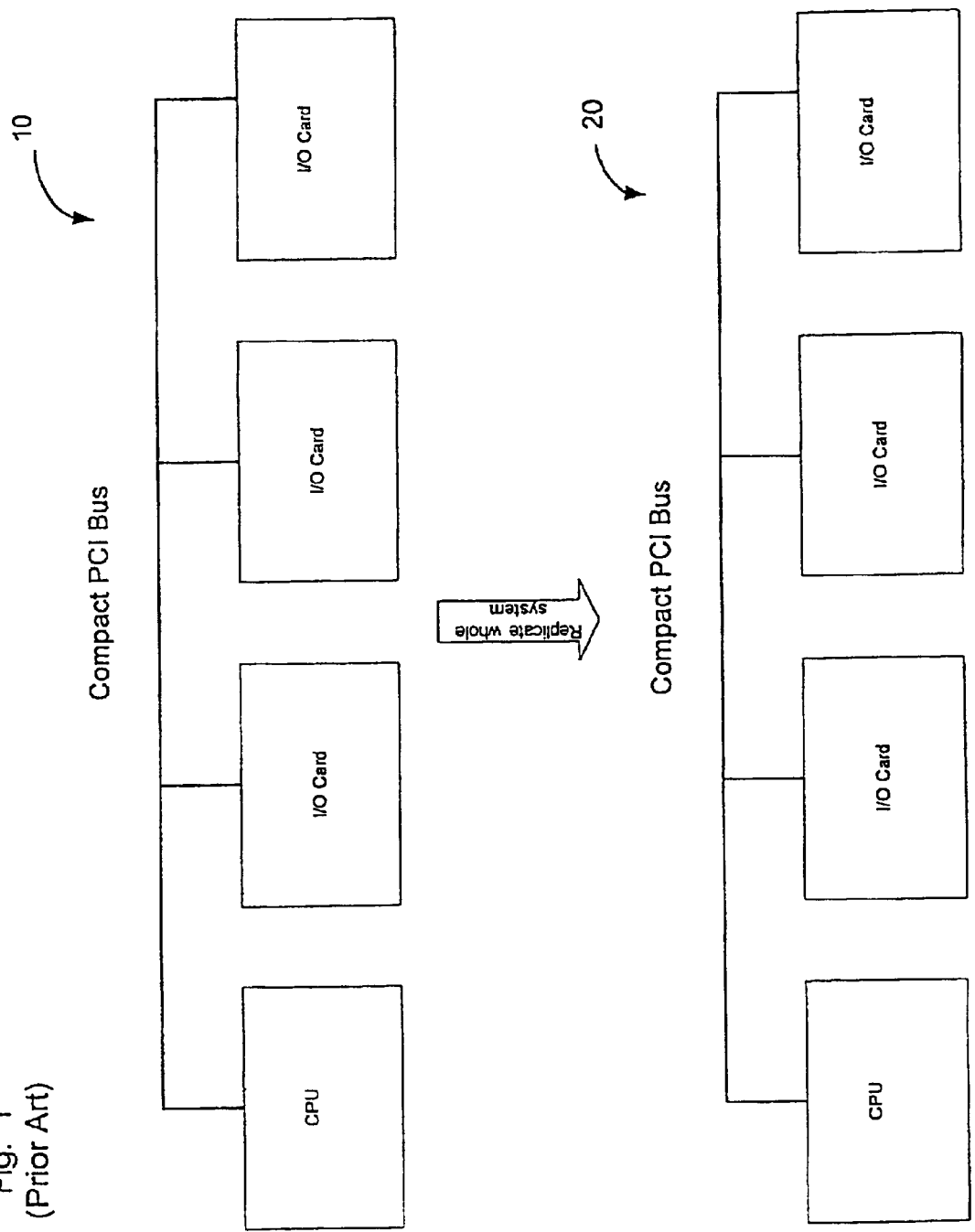
FIG. 1 provides a block diagram of a prior art system addressing high availability through full redundancy.
Figure 2:
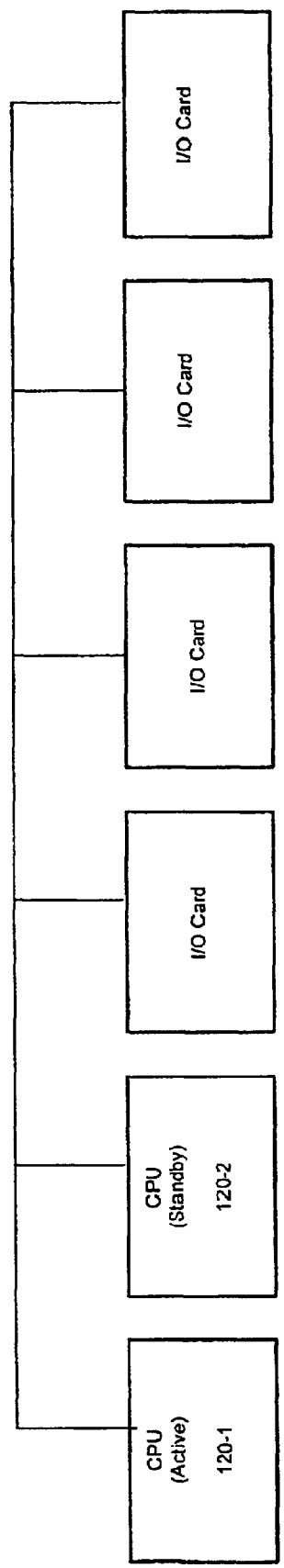
FIG. 2 provides a block diagram of a prior art system addressing high availability through duplication of subsets of hardware instead of the entire node.
Figure 3:
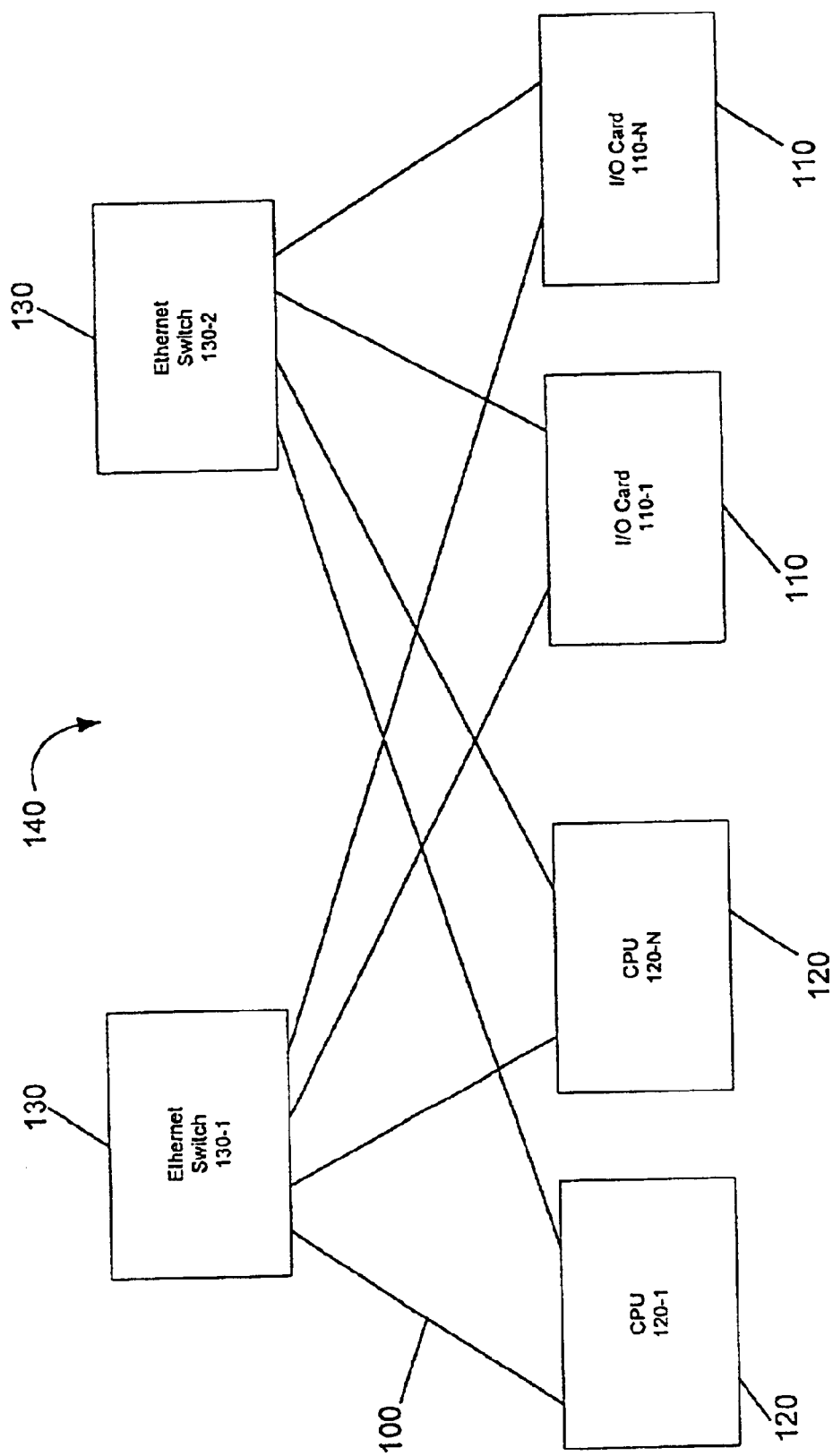
FIG. 3 provides a block diagram of a high availability telecom/datacom computer system in accordance with one embodiment of the present invention.

The present invention finds applicability in a variety of high availability telecom/datacom computer systems that may include platforms for Media Gateway Controllers, SS7 Gateways, OAM&P, Billing, and Call Processing. Other applications will be known to those skilled in the art and are within the scope of the present invention. FIG. 3, illustrating an embodiment of the present invention, is a block diagram of a high availability system implementing a network bus architecture. FIG. 3 has been simplified for purposes of explanation and is not intended to show every feature of the system. As used herein, structure will be referred to collectively or generically using a three-digit number and will be referred to specifically using an extension separated from the three-digit number by a hyphen. For example, I/O cards 110-1 to 110-N will be referred to collectively as I/O cards 110 and an individual I/O card will be referred to generically as I/O card 110 or specifically, for example, as I/O card 110-1.

As shown in FIG. 3, multiple system controllers, CPUs 120, are connected through dual/redundant Ethernet switches 130 to each other and to multiple I/O cards 110. The ports on the cards of the CPUs 120 and I/O cards 110 are connected directly to the dual/redundant ethernet switches 130 using the ethernet links 100, leaving the conventional midplane/backplane (not shown) simply to provide power to the various system components. The system controllers, CPUs 120, provide a redundant platform for control and also may provide transparent IP disk mirroring and boot and configuration services to the I/O processors 110. The dual/redundant ethernet connections allow the CPUs 120 to maintain synchronized states and to have simultaneous access to the I/O cards. These connections, therefore, permit a standby CPU, or an active CPU also serving in a standby capacity, to take over quickly for a failed CPU. In one embodiment the CPUs 120 may be realized using an UltraSPARC™/Solaris™ implementation. Other implementations will be known to those skilled in the art and are within the scope of the present invention. Further, it will be known to those skilled in the art that the system controller functionality is really a role and not a physical implementation, and as such, the system controller functionality can reside on any of the cards, including the I/O cards.

Figure 4:
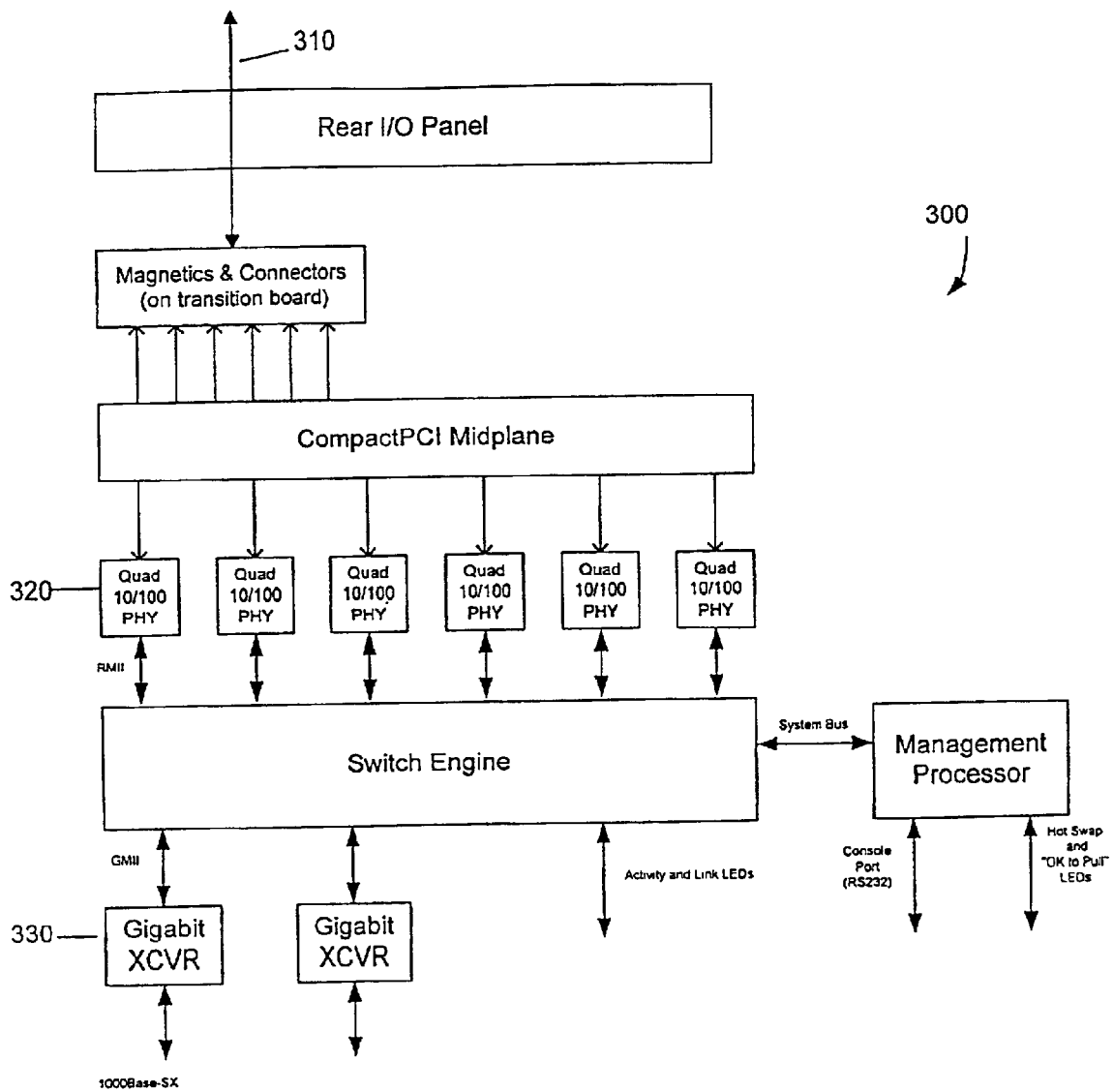
FIG. 4 provides a block diagram of one embodiment of an ethernet switch in accordance with the present invention.

The pair of ethernet switches 130 ensures that the network is not a single point of failure in the system. While the Ethernet is used in illustrating the present invention, the architecture also can be extended to faster networks, such as Gigabit Ethernet or Infiniband. In one embodiment, the switches 130 may be realized using the 24+2 CompactPCI Ethernet switch 300 manufactured by Continuous Computing Corporation, illustrated in FIG. 4. The 24+2 CompactPCI Ethernet switch 300 is a 26-port, non-blocking, fully managed Ethernet switch with 24 10/100 Mbps autosensing, Fast Ethernet ports, and two Gigabit 1000Base-SX ports. The switch 300 provides full wire-speed Layer 2 switching supporting up to 16 k MAC address, 256 IEEE 802.1Q Virtual Lans, IP multicasting, full- and half-duplex flow control and IEEE 802.1Q Quality of Service. The switch 300 enables high-speed communications between elements without external hubs that often block airflow. Moreover, switch 300 can operate in a conventional slot or in an isolated backplane, and can support TCP/IP and serial management interfaces. Other switches will be known to those skilled in the art and are within the scope of the present invention. In one embodiment of the present invention, the network uses TCP/IP running on a 100 Mbit Ethernet. TCP/EP is the industry name for a suite of network protocols that includes, but is not limited to: IP, TCP, UDP, ICMP, ARP, DHCP, SMTP, SNMP. Other network protocols and mediums will be known to those skilled in the art and are within the scope of the present invention.

The intelligent I/O processors 110 are application dependent and may include DSP cards, CPU cards, and voice-processing cards combining DSP, telephony, and RISC resources. These processors 110 may be configured with 2N redundancy, or N+M redundancy, or no redundancy at all. However, to take full advantage of the network bus architecture the processors 110 should have multiple Ethernet interfaces and be able to configure multiple IP addresses on an interface, to run a small heartbeat client, and to boot from onboard flash or over the network. Using the network bus architecture of the present invention, the I/O processors 110 are not limited to conventional PCI or CompactPCI I/O slot processors. Because there is no conventional bus, standard system slot processor boards can be used in the I/O slots of the system 140, considerably increasing the range of cards available.

The high availability system also may include dual power supplies (not shown) with either power supply capable of running the whole system. In one embodiment the power supplies are realized using Continuous Computing Telecom Power Supply (CCTPS) manufactured by Continuous Computing Corporation, which offers 350 watts of hot-swappable, load sharing power to the system with dual input feeds and −48V DC input. Other power supplies will be known to those skilled in the art and are within the scope of the present invention.

Figure 5:
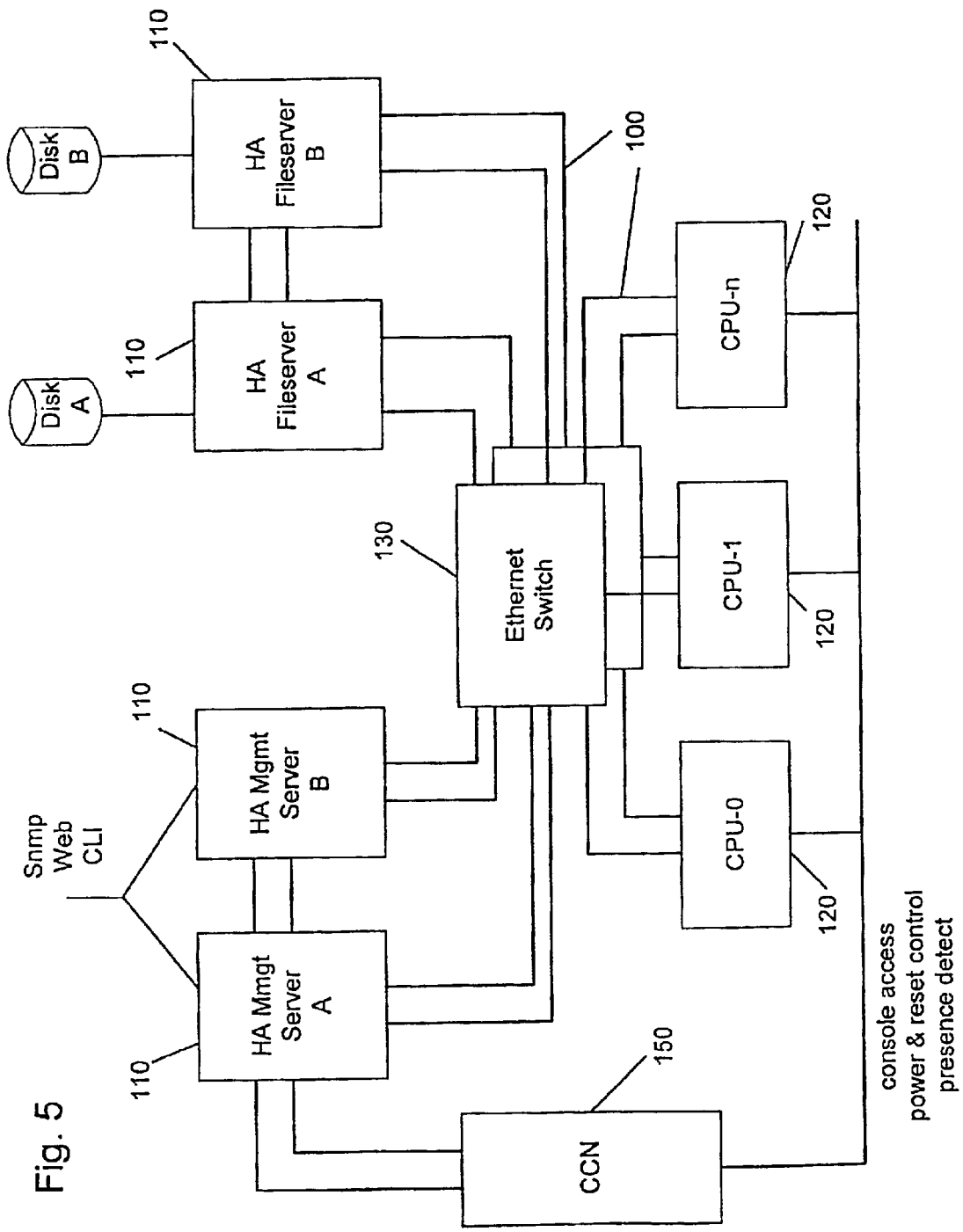
FIG. 5 provides a block diagram of a high availability telecom/datacom computer system in accordance with another embodiment of the present invention.

FIG. 5 illustrates another embodiment of the high availability architecture of the present invention. In this embodiment, the system includes a Continuous Control Node (CCN) 150 to monitor and control the CPUs 120, I/O cards 110, and the power supplies. The CCN 150, which may be connected to the other system components via the ethernet links, provides presence detect, board health, and reset control for the high availability system. These functions may be accomplished using a set of logic signals that are provided between each system board and the CCN 150. The logic signals may be, for example, the negative-logic BDSEL#, HEALTH#, and RST# signals described in the Compact PCI Hot Swap Specification and incorporated herein by reference.

In one embodiment of the present invention, the CCN 150 can power up and power down individual slots and provide network access for any boards that have serial consoles. The power control may be accomplished using the set of logic signals mentioned above; however, the only requirement is a single-ended logic signal of either logic polarity which, when asserted, will override power control on the I/O board and effect the power down of the board. The software requirements are, at a minimum, a function executed on the CCN 150 that causes the hardware to read and set the logic level of the pertinent signals.

Serial console access to the I/O boards 110 is provided in hardware by cabling or malting direct midplane connection of the I/O board serial-port signals to the CCN serial port signals or in software by configuring one or more of the serial ports onboard, and relaying the serial data stream to the network communications port designated for this console access.

The CCN 150 also may function as a single point of contact for management and provisioning of the entire system. The CCN 150, which for one embodiment is always powered, may allow a remote technician to check the system status, power cycle the system or its subcomponents, and/or access the console. The CCN 150 may be realized using the Continuous Control Node manufactured by Continuous Computing Corporation, the Continuous Control Node incorporated herein by reference.

Figure 6:
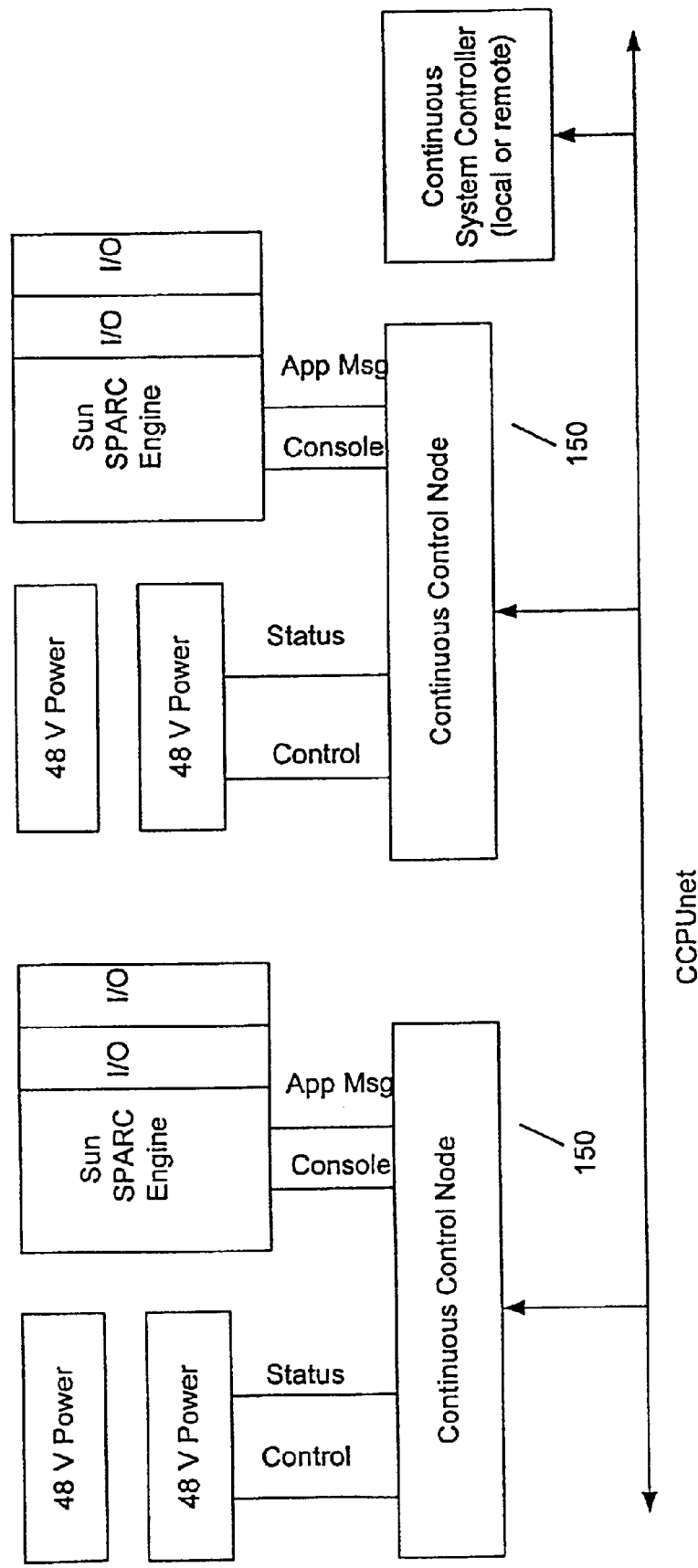
FIG. 6 provides a block diagram of one embodiment of a continuous control node in accordance with the present invention.

In a further embodiment of the present invention illustrated in FIG. 6, all of the CCNs from various high availability systems communicate over a redundant out-of-band network allowing the monitoring and control of a large number of systems from a single network management station. The CCN 150 may offer numerous interfaces for system management, including a serial command line interface, a JAVA GUI and a C/C++ API for interfacing user applications to the control network. The combination of these features provides a powerful tool for system maintenance.

Figure 7:
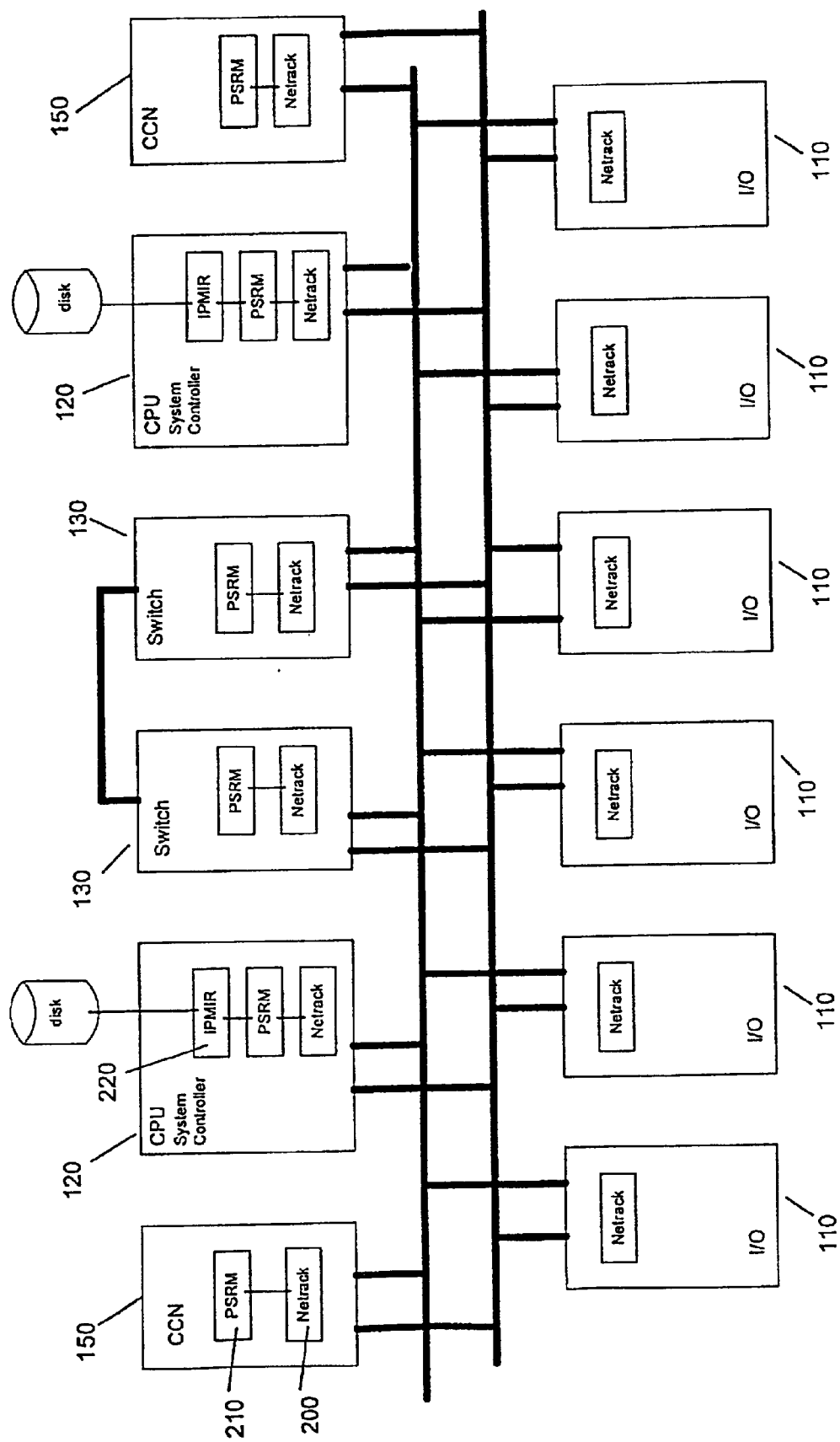
FIG. 7 provides a block diagram showing software components incorporated in accordance with one embodiment of the present invention.

As illustrated in FIG. 7, the network bus architecture of a further embodiment of the present invention also may incorporate a set of software components and APIs (collectively referred to as SOFTSET) that detects failures in the system, routes around the failure, and alerts a system manager that a repair is required. The set of software components and APIs may be realized, for example, using upSuite™ by Continuous Computing Corporation, upSuite™ incorporated herein by reference. The functions that SOFTSET performs in order to provide high availability can be divided into two categories: failover and data redundancy. The various modules of SOFTSET address each of these. Failover is address by the NETRACK and REDIRECT modules: NETRACK keeps each individual component aware of the state of the other components in order to perform rapid failover; REDIRECT defines complex failover conditions and informs the system so that it can respond appropriately to various conditions. Data redundancy is addressed by the IPMIR and UPSTATE modules: IPMIR mirrors and updates the file system data while UPSTATE ensures in-memory application data redundancy.

SOFTSET offers a simple middleware layer, accessible to application developers, that can be used to create a TELCO grade, 99.999% reliable system. IPMIR, the IP file system mirroring module of SOFTSET, simultaneously writes data to a local drive as well as to a network-connected processor and its local drive at wireline speeds. In the event of a need to failover, the standby processor can be triggered as active using REDIRECT and NET/TRACK. Through these two modules, all components are aware of their status in conjunction with other components, and a uniform set of rules exists to govern failover, both simple and complex. The standby system assumes the tasks of the active system within 250–500 ms. IPMIR and UPSTATE ensure that data is redundant and constantly kept up to date.

Although the systems are labeled as "Active" and "Standby," these terms are not used here in the conventional sense. The standby, for example, may perform tasks that are not normally associated with standby operations. A more accurate designation for the systems would be Read/Write (RW) and Read Only (RO). SOFTSET supports at least one RW and one RO server at a time, but may support multiple RW and RO servers.

The first role of SOFTSET is to guarantee communication among all the components in the system. To accomplish this, a heartbeat manager NETRACK 200 of SOFTSET runs on every component on the system and is designed to keep track of which components and services are up and which are down. Heartbeats provided by the individual system components enable NETRACK 200 to detect component failures and to build a map of working network connections. By comparing the network map to the system configuration, NETRACK 200 can detect network failures.

Local network applications provide a second source of information for NETRACK 200. For example, an orderly shutdown script could inform NETRACK 200 that a system was going down. NETRACK 200 would then relay that information to the other NETRACKs 200 whose systems might take action based on that information. In particular, another SOFTSET software component, a process starter/restarter/monitor (PSRM) 210, is designed to talk to NETRACK 200.

Finally, applications can connect to NETRACK 200 to get status information. For example, a standby media gateway controller application may ask NETRACK 200 for notification if the other server, or even just the other application, goes down. Applications can receive all status information, or they can register to receive just the state changes in which they are interested.

Figure 8:
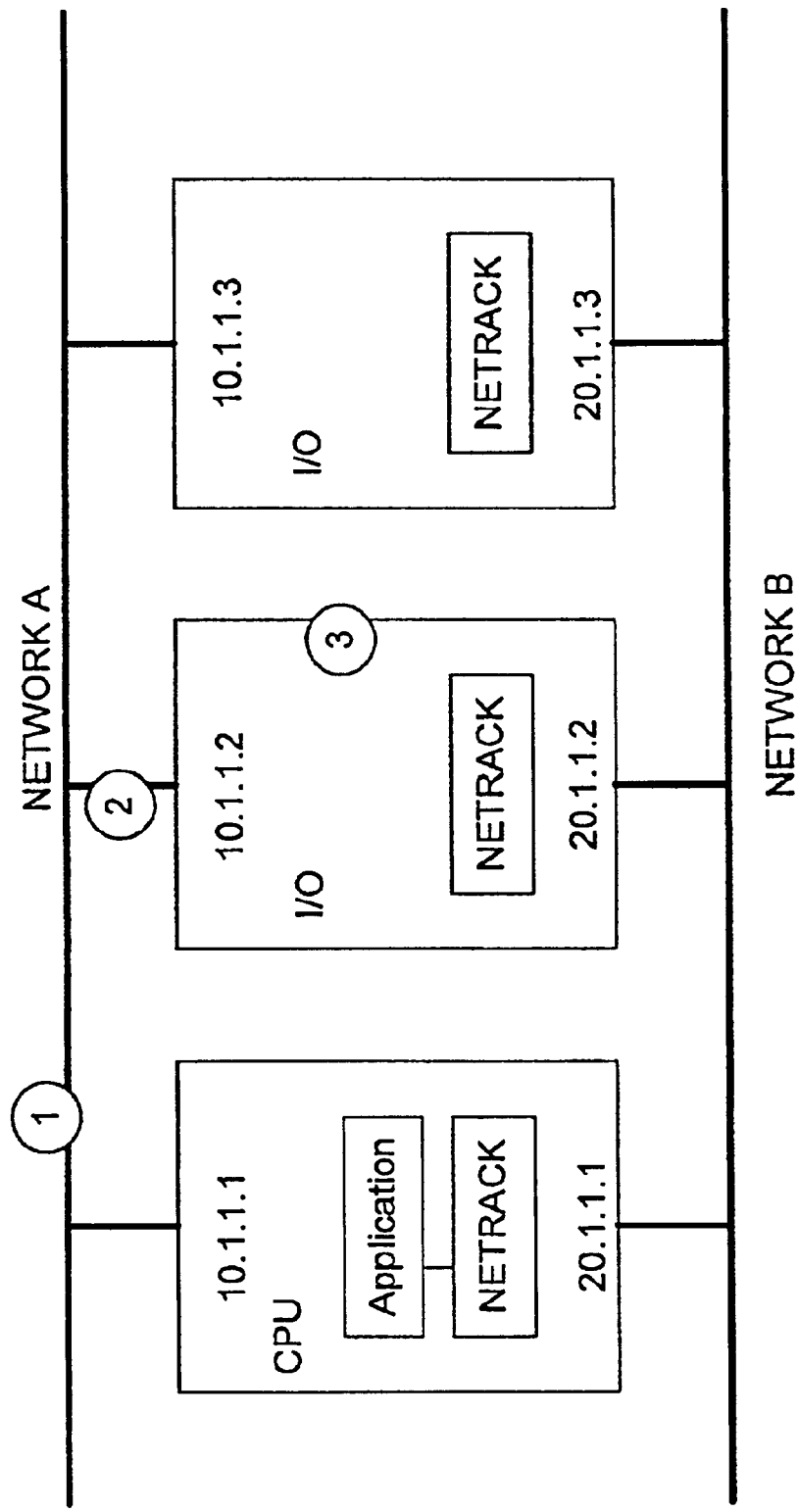
FIG. 8 illustrates the role of NETRACK during typical component failures occurring in the system for one embodiment of the present invention.

FIG. 8 illustrates the role of NETRACK during typical component failures occurring in the system. Each CPU or I/O component has two network addresses. For example, the CPU may be communicating over network A to the first I/O card using the address of the I/O card on network A which is 10.1.1.2. NETRACK constantly sends small packets over both networks to all components and listens for packets from the other components. In FIG. 8 there are three points of failure:

Network A fails. In this case, NETRACK on the CPU detects that the first I/O card is no longer responding via 10.1.1.2, but is responding via 20.1.1.2. NETRACK immediately instructs the application to stop using 10.1.1.2 on network A and to start using 20.1.1.2 on network B.

The first I/O card's link to network A fails. Again, NETRACK on the CPU detects that 10.1.1.2 has stopped working but that 20.1.1.2 is working, and instructs the application as in (1).

The first I/O card fails completely. NETRACK on the CPU detects that the first I/O card is not responding at all, but that the second I/O card is responding on both networks, and it instructs the application to use 10.1.1.3 or 20.1.1.3.

The second role of SOFTSET is to guarantee that a software service or application is running and available on the network. This is accomplished using PSRM 210. While an application can be coded to connect directly to NETRACK 200, for many applications it makes sense simply to 'wrap' the application in PSRM 210. For "off the shelf" software, this is the only choice. PSRM 210 is designed to give developers maximum flexibility in configuring the behavior of their applications.

Figure 9:
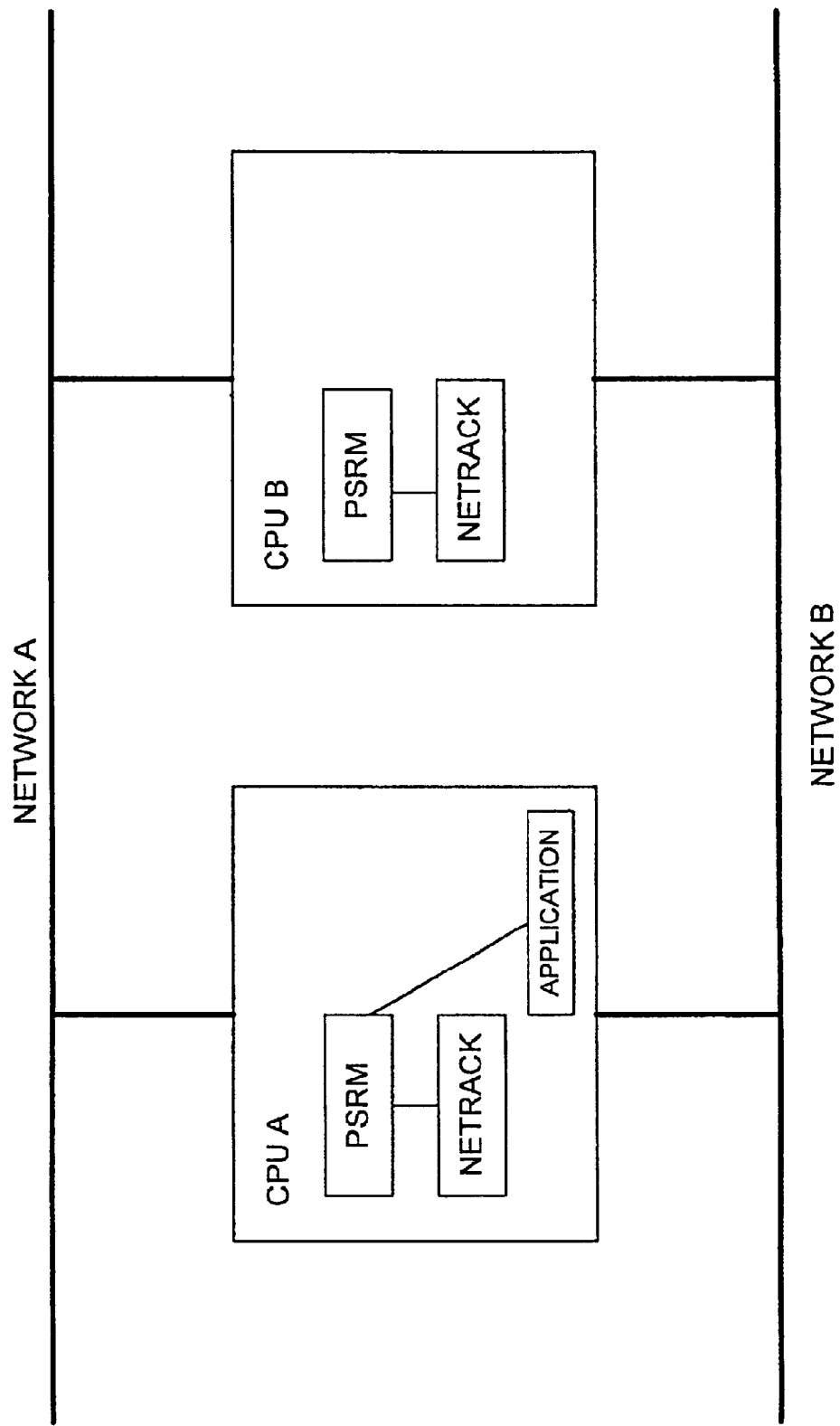
FIG. 9 illustrates PSRM starting and monitoring an application in accordance with one embodiment of the present invention.

FIG. 9 illustrates PSRM starting and monitoring an application. PSRM starts the application and monitors its health. PSRM reports the status of the application to NETRACK, which in turn reports to all the other NETRACKs on the other components of the system. There are several possible failures:

1) The application dies. For example, a Unix or Linux operating system is running applications as independent processes that may 'die'. Other operating systems will be known to those of ordinary skill in the art and are within the scope of the present invention.
2) The application stops responding.
3) The application is having trouble: it can still communicate with PSRM, but it may be running slowly, or be unable to allocate resources, etc.

In any of these failures, PSRM has the choice of:
1) restarting the application
2) stopping the application and asking another component (CPU B in FIG. 9) to start an equivalent application
3) doing nothing (e.g. if the application is merely running slowly)

In all cases, PSRM and NETRACK make sure that all system components are able to reach the application over at least one network interface. PSRM 210 keeps NETRACK 200 informed of the state of the process at all times. In a more complicated case, PSRM 210 might only restart a process that dies with certain exit codes, or PSRM 210 might only try a certain number of restarts within a certain period. This functionality and flexibility is available through simple configuration—it does not require programming or any modifications to an application. Finally, applications that require the highest level of integration may communicate directly with PSRM 210.

Figure 10:
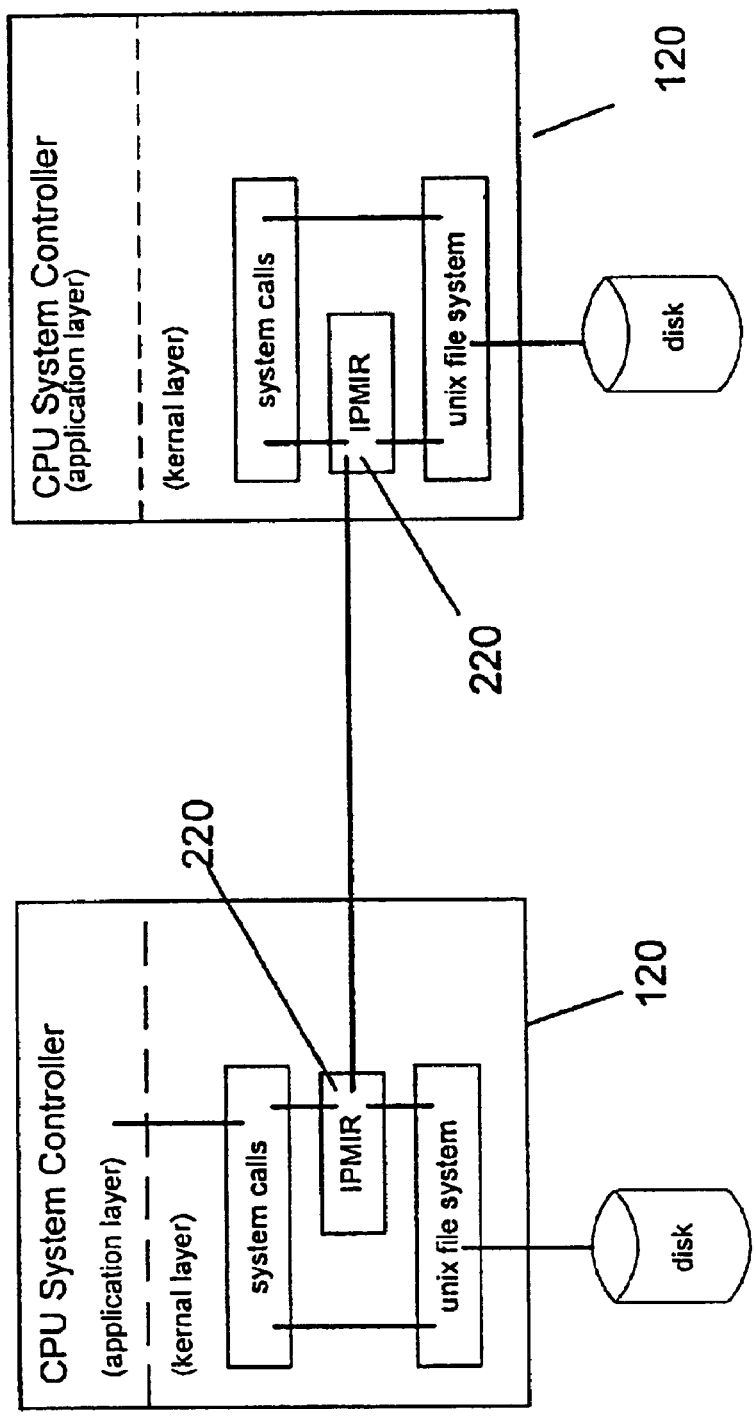
FIG. 10 provides a block diagram illustrating disk mirroring in accordance with one embodiment of the present invention.

A third software component of SOFTSET, IPMIR 220, ensures data reliability by providing application-transparent disk mirroring over IP. Data written to disk are transparently 'mirrored' over the network via IPMIR 220; "transparently" meaning the applications are not necessarily affected by the mirroring. As illustrated in FIG. 10, the two system controllers 120 run IPMIR 220 between each other to mirror disk activity. I/O processors use NFS to mount the disks from the active server. In the case of a failure (CPU, disk, network, etc.), the standby server assumes the IP address of the failed NFS server and continues serving files from its mirror of the data. Although this IP failover technique will not work for other IP disk mirroring packages (Unix administrators may be familiar with the 'Stale NFS Handle' problem), IPMIR 220 is specifically designed to handle this situation. IPMIR 220 maintains a lookup table for NFS file handles which avoids the stale file handle problem by translating client/server transactions so that the HA file server presents the same identity to the client regardless of which component server is active allowing client requests to be serviced by any component.

While IPMIR may be realized using upDisk/IPFS product from Continuous Computing Corporation using the Solaris operating system, the techniques disclosed could be applied to any standard network file service (e.g., NFS, CIFS, AFS, etc.) and could be implemented on any operating system (e.g., Unix, Linux, Windows, MacOs, etc.). Further, since all current desktops and embedded operating systems can act as NFS clients, the server embodiment may be used on any computer network.

Figure 19:
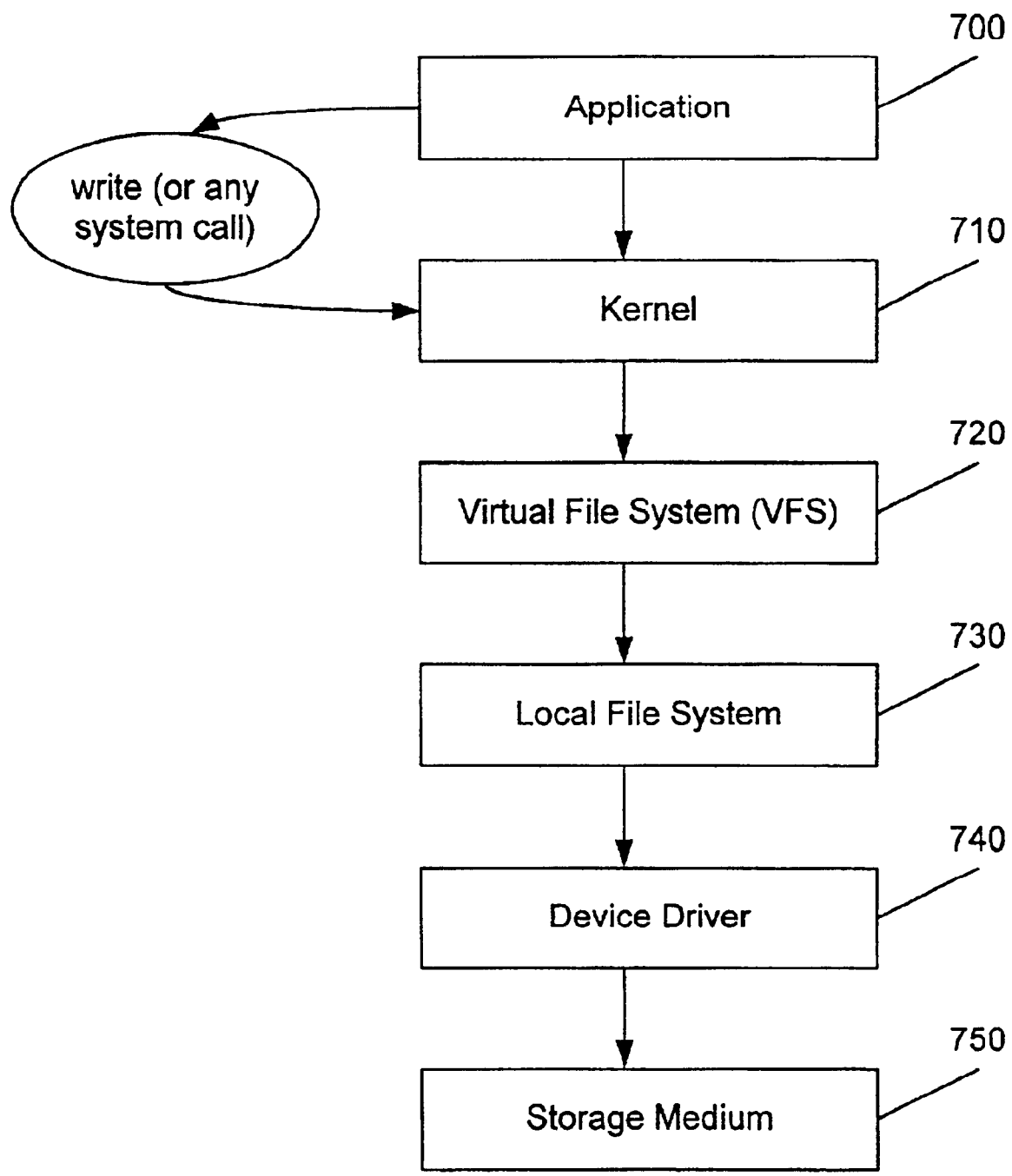
FIG. 19 provides a flowchart illustrating the route of a conventional disk write.
Figure 20:
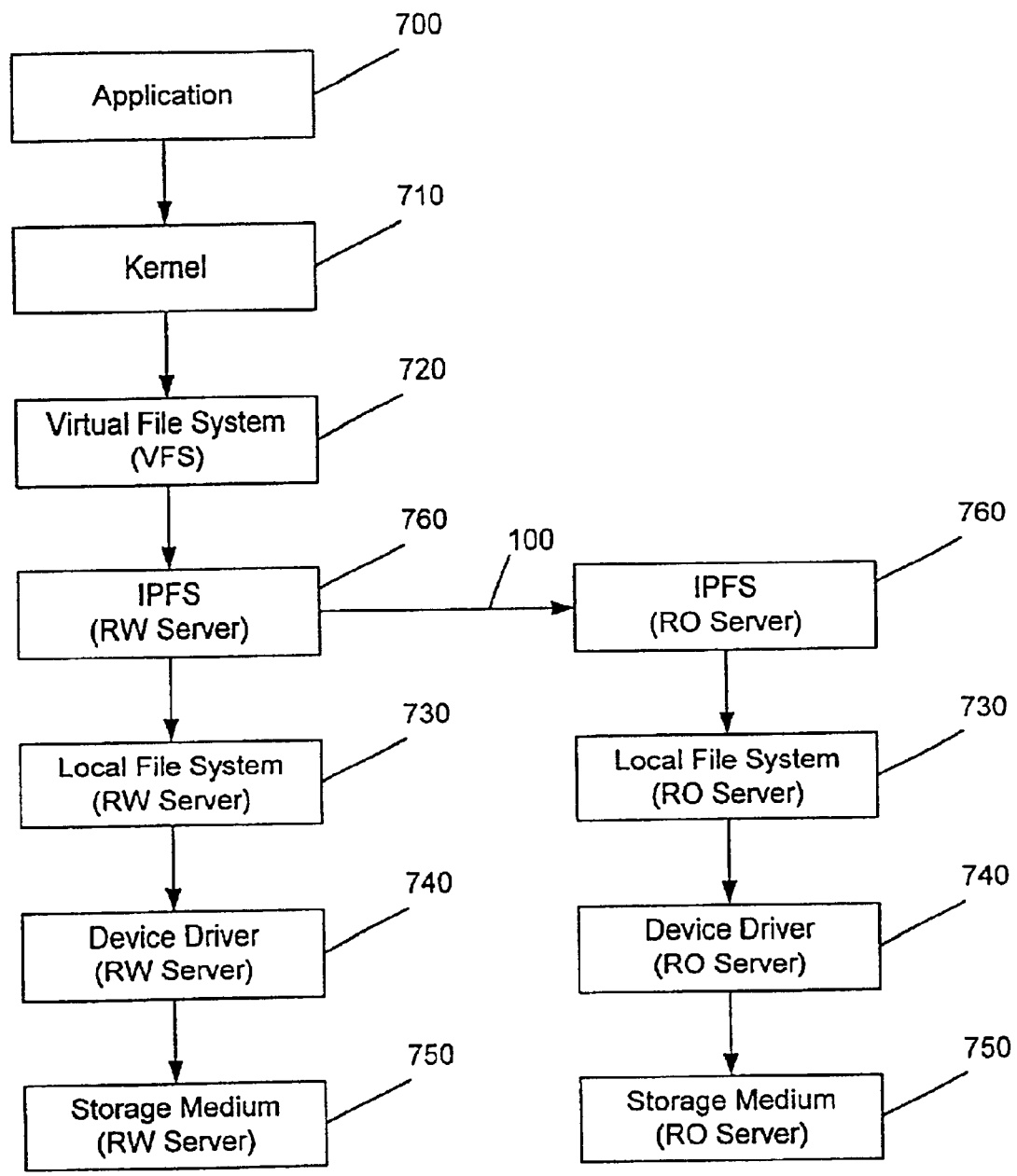
FIG. 20 provides a flowchart illustrating a disk write associated with an embodiment of the present invention.

Disk Mirroring. FIG. 19 illustrates the route that a conventional disk write takes through the system. The typical system call, a write ( ) in this case, is sent from the application 700 to the kernel 710. The call then passes to the virtual file system (VFS) 720 before going to the local file system 730 which could be a Unix file system (UFS) for example. At this point, it becomes a system-specific call to a device driver 740 for the storage medium 750 in question. To accomplish the simultaneous writes, IPMIR inserts an extra layer in this process as shown in FIG. 20. The interposing file system ("IPFS") intercepts file system operations, passes the operations to the underlying local file system, and if appropriate, passes the operations across the network to the other component servers; for example, IPFS would pass write operations to all component servers, but read operation would only be passed to the local file system. IPFS functions independently of the details of the local file system allowing the file systems on the component servers to be implemented differently (e.g., using a local hard disk, in-memory RAM, or a read/write optical disk). With reference to FIG. 20, with IPMIR installed the virtual file system IPFS 760 exists between the VFS 720 and the local file system layer 730. The system call is passed from the VFS 720 to IPFS 760. IPFS 760 then passes the call both to the local file system 730 and also laterally over the network to another instance of IPFS 760 on a second machine. This second instance of IPFS 760 passes the write down through the RO processor's local file system 730 to its disk array 750.

Figure 21:
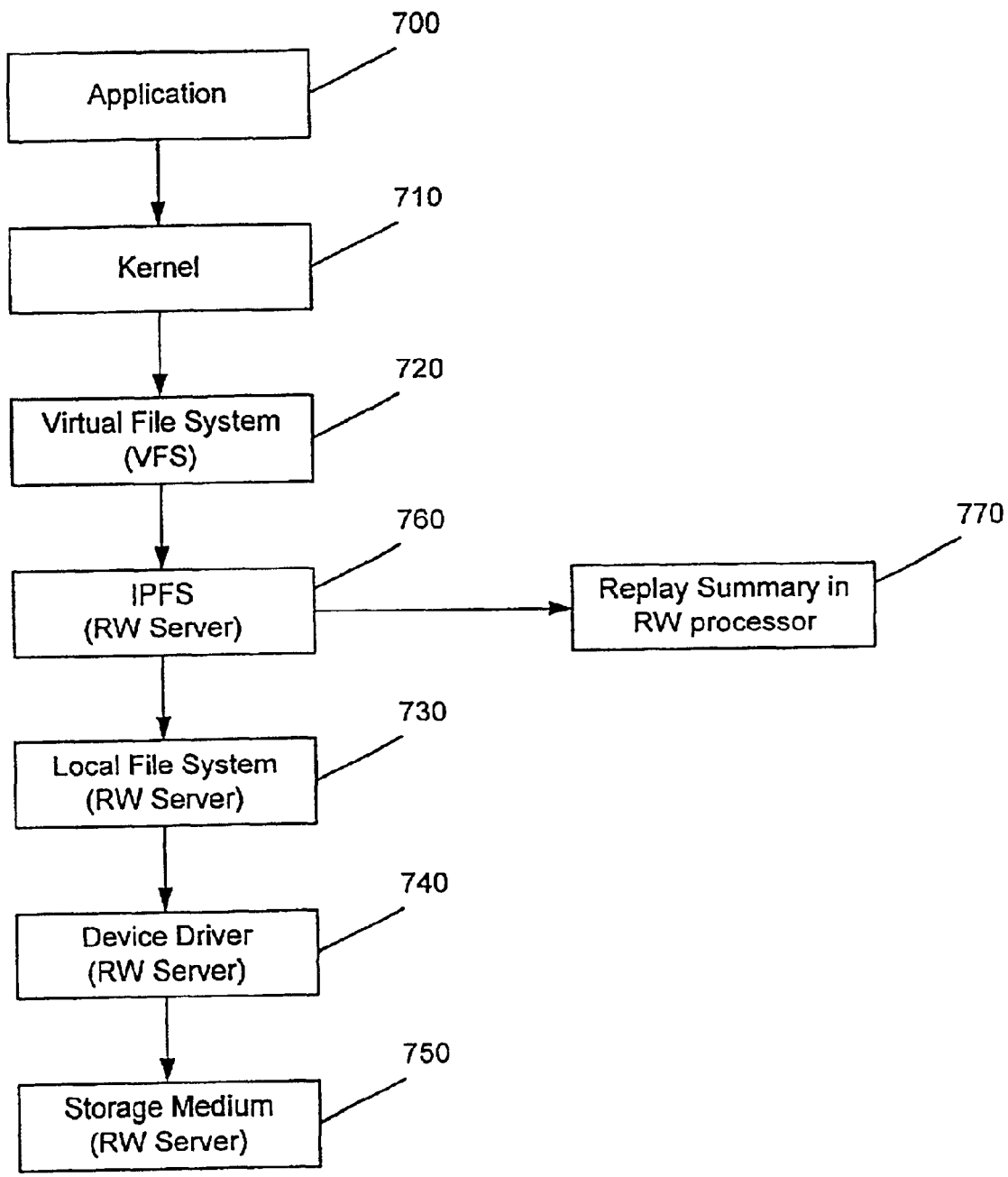
FIG. 21 provides a flowchart illustrating recovery operations associated with an embodiment of the present invention.

In normal operation IPMIR sends the file operations over the network by queuing up "replay" operations as shown in FIG. 21, so that total store order (TSO) is preserved on the RO for applications (such as data bases) for which it is required in the event of RW system. If the link or RO system fails, IPFS summarizes the operations performed during the outage. In most cases, IPFS can summarize operations for an indefinite period. When the link or RO system is made available again, IPFS must first determine if there has been any data lost on the RO system from component failure or replacement. If no data has been lost, IPFS uses the summary information to replicate exactly the changes necessary to make the RO system consistent with the RW. If data has been lost on the RO or the capacity to summarize operations has been exceeded, then a differential analysis of the RW and RO data sets is made with a multi-threaded differencing engine. The use of multi-threading maximizes the utilization and overlap of local I/O on both systems and network I/O between them. The use of checksums avoids the unnecessary transmission of raw data over the network link.

IPMIR performs all the functions necessary for performing simultaneous disk writes across a TCP/IP network at wireline speeds, making that information immediately available to a client, and transparently so in the case of a failure. When a RW processor writes information to its local disk, the same information is written via the network to the disk of a RO processor at wireline speeds. The specific disk media is irrelevant to IPMIR and may be, for example, standard SCSI, Fiber channel, or RAID arrays.

Figure 22:
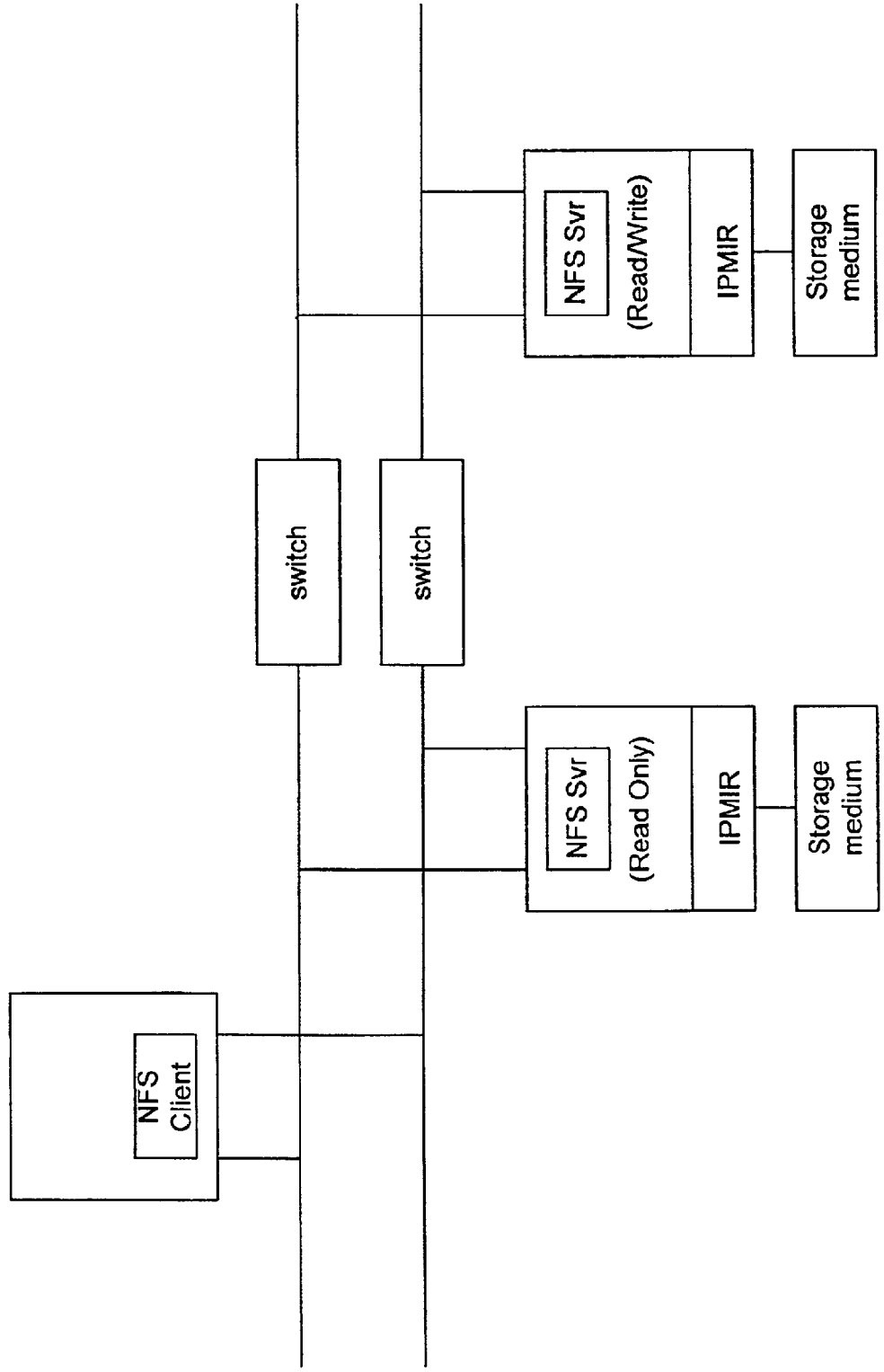
FIG. 22 illustrates the environment associated with one embodiment of the present invention.

File Handle Failover. Another aspect of the IPFS layer in IPMIR is its role in effecting transparent failover. IPFS failover capabilities find application, for example, in the environment shown in FIG. 22 where a machine running as an NFS client is connected via network links to a set of redundant processors and disks, one of which is an active NFS Server (in RW operation) and both of which are running IPMIR. Other environments will be known to those of ordinary skill in the art and are within the scope of the present invention. For example, while desirable for HA systems, the client does not need to be on redundant networks to effect the IPFS capabilities of the present invention.

Figure 23:
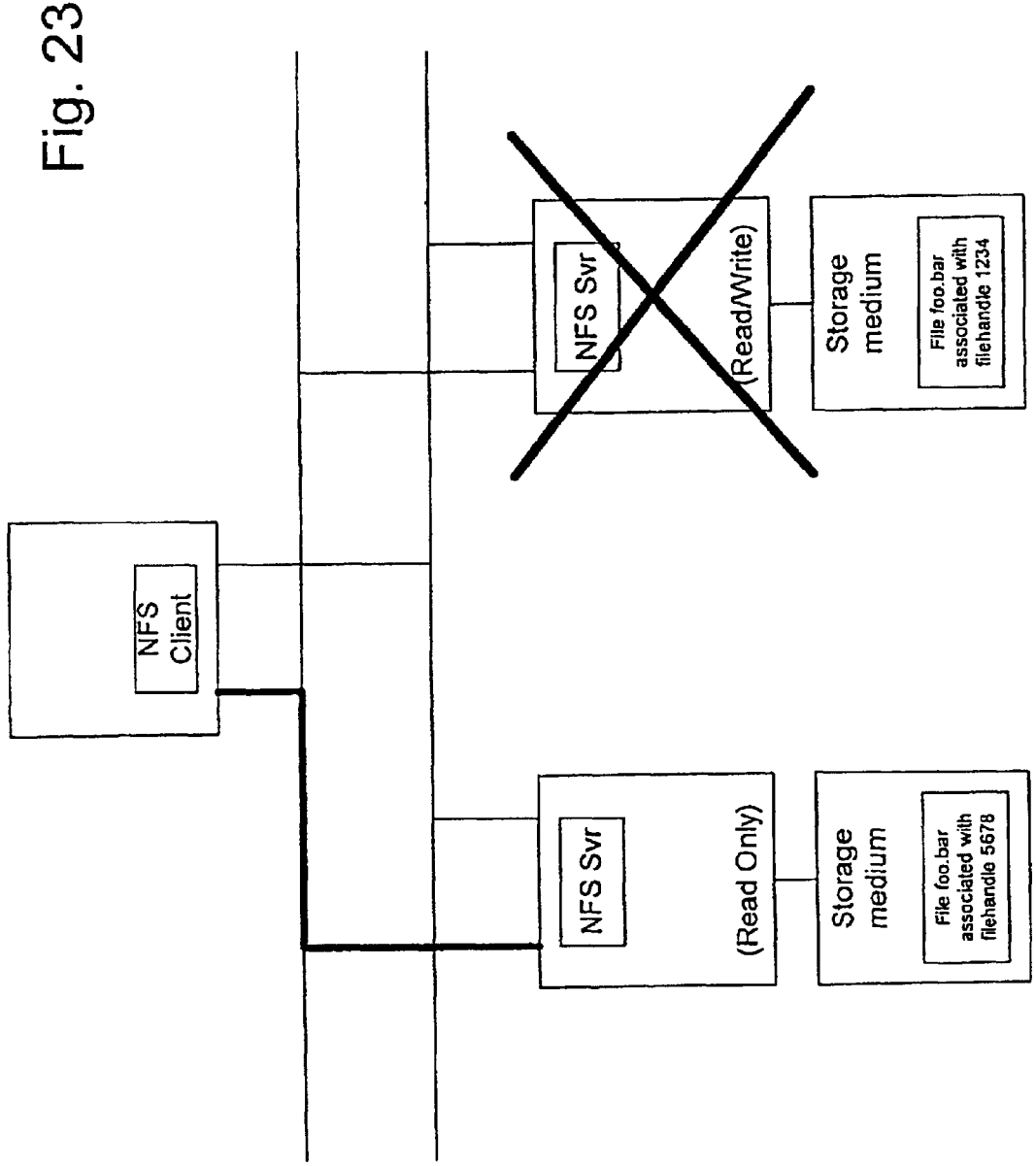
FIG. 23 illustrates a failover in a conventional system.
Figure 24:
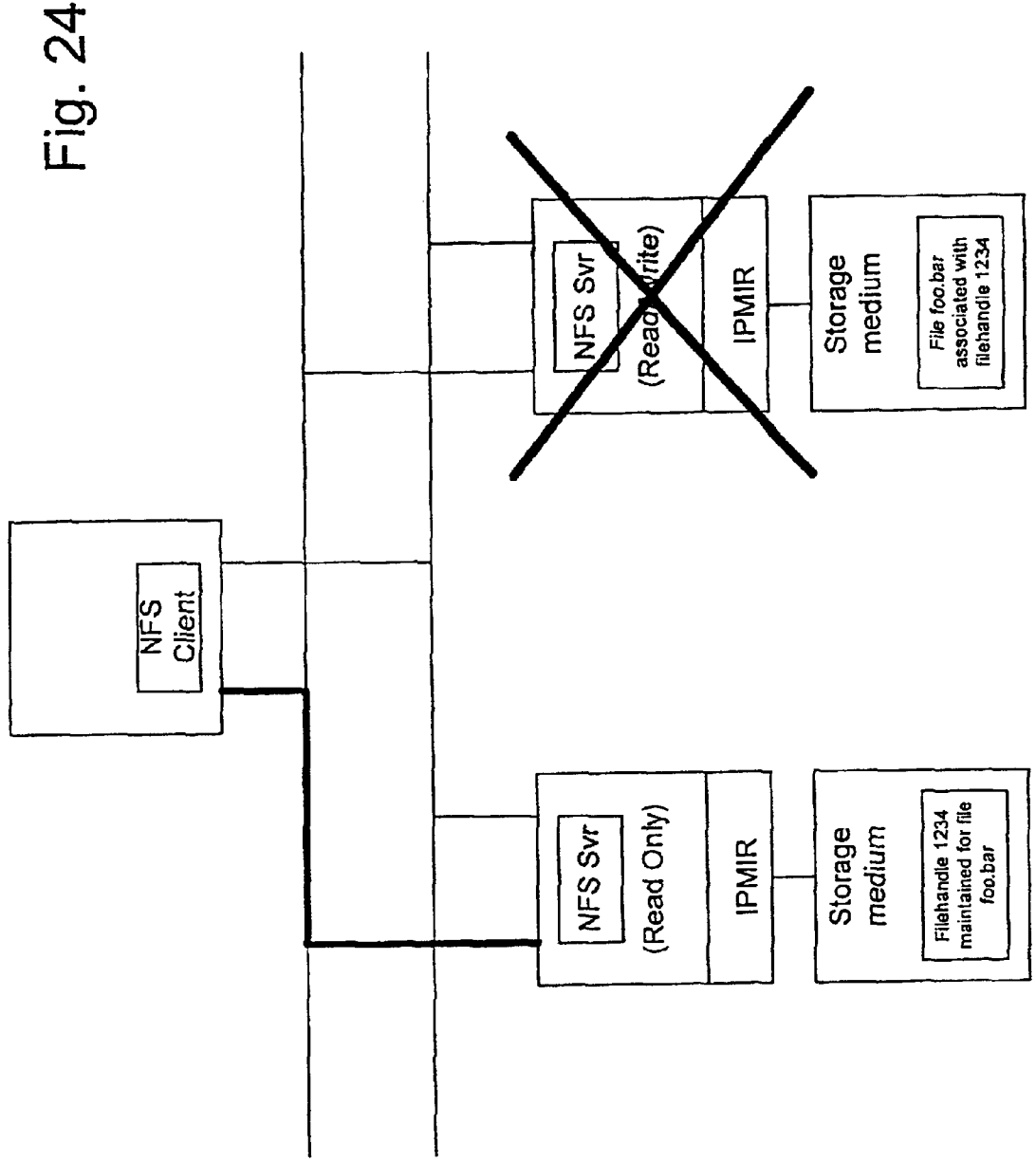
FIG. 24 illustrates file handle failover associated with an embodiment of the present invention.

Standard network file services deliberately differentiate file servers, file systems, and files, even if the contents are identical. While this behavior may be desirable for standalone file servers, it presents a problem for HA file servers when one component server takes over for another during failover; a client may reject a server that suddenly appears to be a different server, or a server may reject client requests that appear intended for a different server. FIG. 23 illustrates a typical case of a failover resulting in the return of stale file handles once the RO server awakens and begins to provide service (i.e., file foo.bar is associated with file handle 5678 in RO server instead of file handle 1234 as in failed RW server). IPMIR avoids this problem by maintaining a lookup table to allow the same NFS file handles to be used on both the RW and RO systems as shown in FIG. 24. When the RO server awakens, the client sees absolutely no difference between it and the RW server that was previously providing service. When failing over to the RO system, an NFS client would immediately see the same filename and identifiers as it had seen previously.

To accomplish this "file handle failover," a standard network file system and standard TCP/IP protocols (e.g., NFS) are used to make file system data available to clients on the network. Typically, when a client requests access to an NFS file, the server returns a file handle containing information about the file. The client does not interpret the file handle, but passes this handle back to the server for all subsequent operations on this file. The server embeds several pieces of information in the file handle; this information uniquely identifying the server, the file system, and the file generation and correlating the file handle with a file on the server's local file system. The system uses this information to make sure the client is making requests of the exact same file system on the exact same server that originally handed out the file handle. If a system administrator rearranges the file systems, reformats a disk, or assigns a server's IP address to a new server, NFS can detect that the server has changed. Further, NFS can use the file generation to detect if a file has been deleted and a new one with the same name has been created, or if the local file system file id (e.g., inode) has been reused. If any part of the file handle does not match, a server will reject an NFS request, and the client will experience a failure. To prevent this, IPMIR/IPFS coordinates all component servers in an HA file server so that all component servers embed the same unique server and unique file system information in the file handles. Further, a lookup table is implemented to allow any component server to associate a file handle generated by any other component server with the correct file in its own local file system. In another embodiment, generic file handles are generated and maintained in the lookup table to allow any component server to correctly interpret the file handle regardless of the local file system layout. The lookup table is maintained by IPMIR/IPFS as file system operations are propagated among the component servers.

Figure 25:
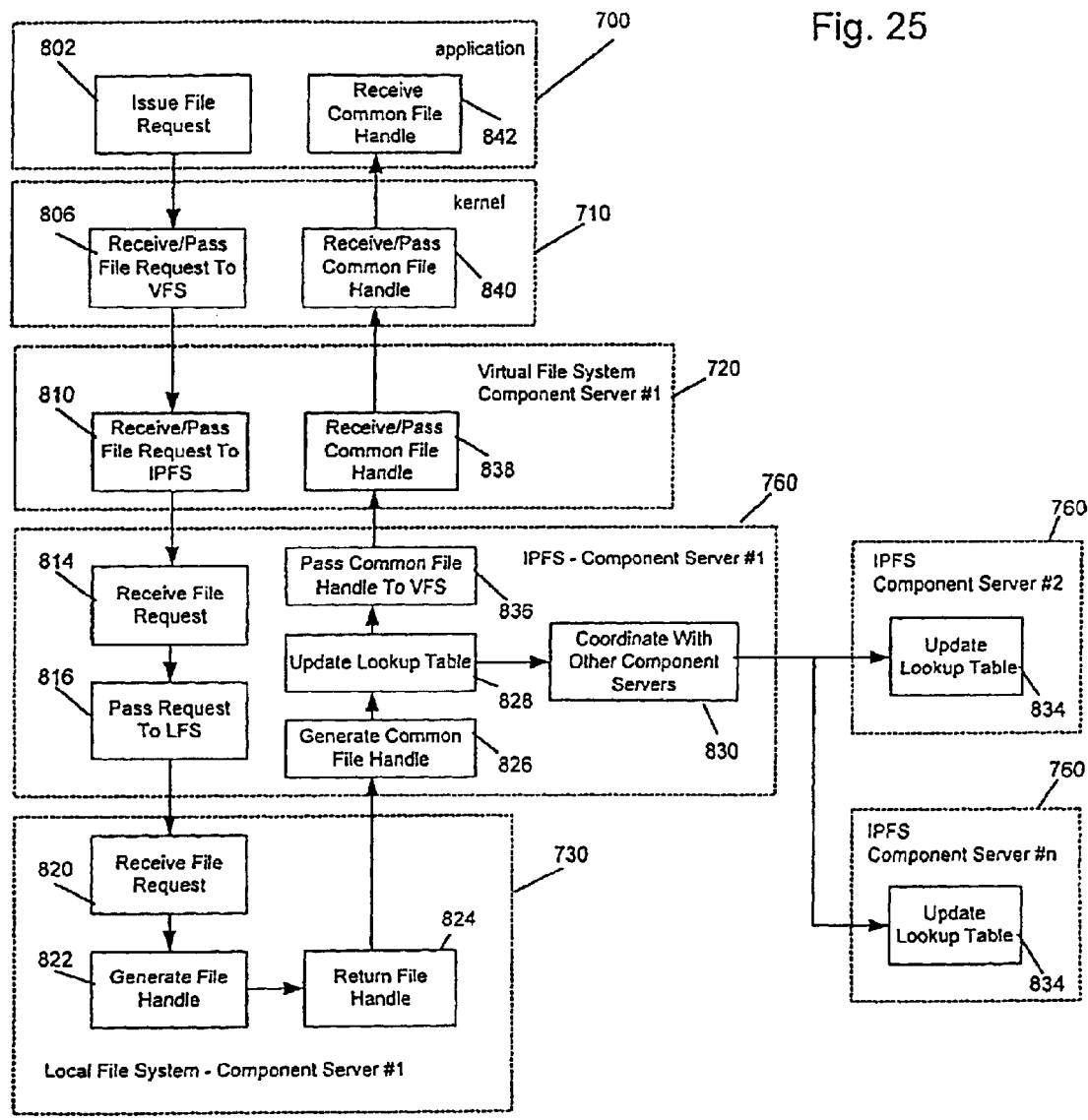
FIG. 25 illustrates the process flow for generating file handles for one embodiment of the present invention.

FIG. 25 illustrates the process by which the file handles for one embodiment of the present invention are generated and maintained. The application 700 issues a file request (step 802) which passes through the kernel 710 (step 806), the VFS 720 (step 810), and IPFS 760 (steps 814, 816) to the LFS 730 (step 820). The LFS 730 generates and returns a file handle based on the specifics of the particular LFS (steps 822, 824). IPFS 760 receives the LFS file handle, generates a common file handle (step 826), updates its lookup table (step 828), and then coordinates with the IPFS instances 760 of the other component servers to update their respective lookup tables such that each component server associates the common file handle to the correct file in its own local file system (steps 830, 834). IPFS 760 returns the common file handle to the application 700 via the VFS 720 and the kernel 710 (steps 836, 838, 840, and 842). In other embodiments, the coordination among the component servers, the common file handle generation, and the update lookup table processes may be performed in other orders. For example, the RW instance of IPFS may coordinate with the remaining instances of IPFS to generate the common file handle. Further, the coordinate and generate common file handle processes may initiate on receipt of the file request by the RW instance of IPFS (step 814) and complete on the receipt of the LFS file handle. Also, the lookup table need not be maintained as a separate table by each instance of IPFS but may be a common table accessible by all IPFS instances. Other process orderings and table maintenance will be known to those of ordinary skill in the art and are within the scope of the present invention.

Figure 26:
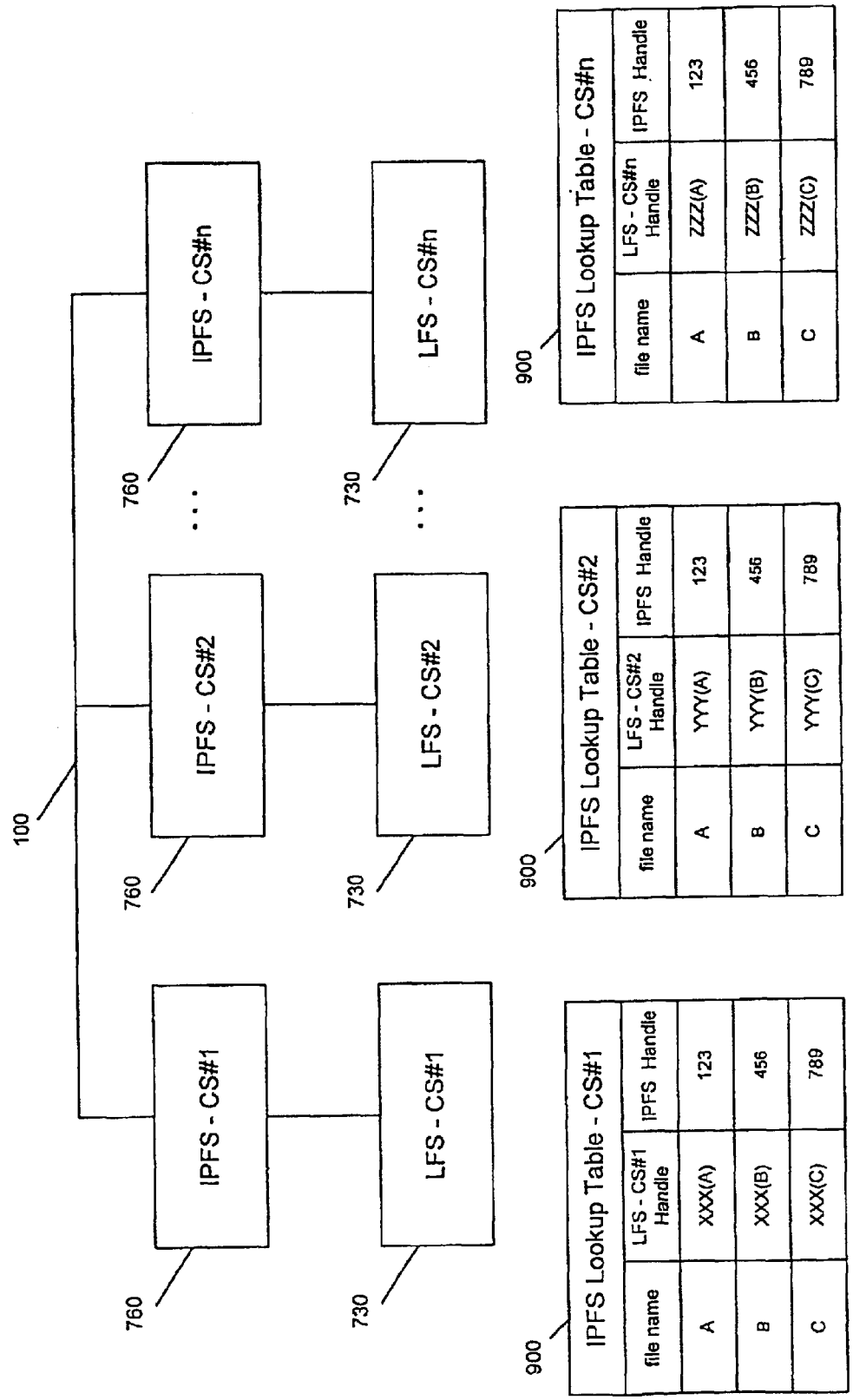
FIG. 26 illustrates a lookup table in accordance with one embodiment of the present invention.

FIG. 26 illustrates the look up tables maintained by IPFS 760 for one embodiment of the present invention. In this embodiment, a generic file handle (i.e., not specific to any particular local file system LFS 730) is generated and maintained in the lookup table of each IPFS instance 760 (e.g., IPFS file handle 123 for file A). The generic handle is associated with the correct file in the local file system LFS 730 using a file handle specific to the particular LFS of each component server, the different file handle formats for the local file systems indicated by XXX(A), YYY(A), and ZZZ(A). Since the generic file handle is used in the client/server transactions, any server can perform the indicated transaction; failover from one server to another is transparent. Further, the translation of the generic file handle to the LFS specific file handle by the IPFS lookup table removes any requirements as the media, implementation, or location of the local file systems associated with the various component servers.

Figure 27:
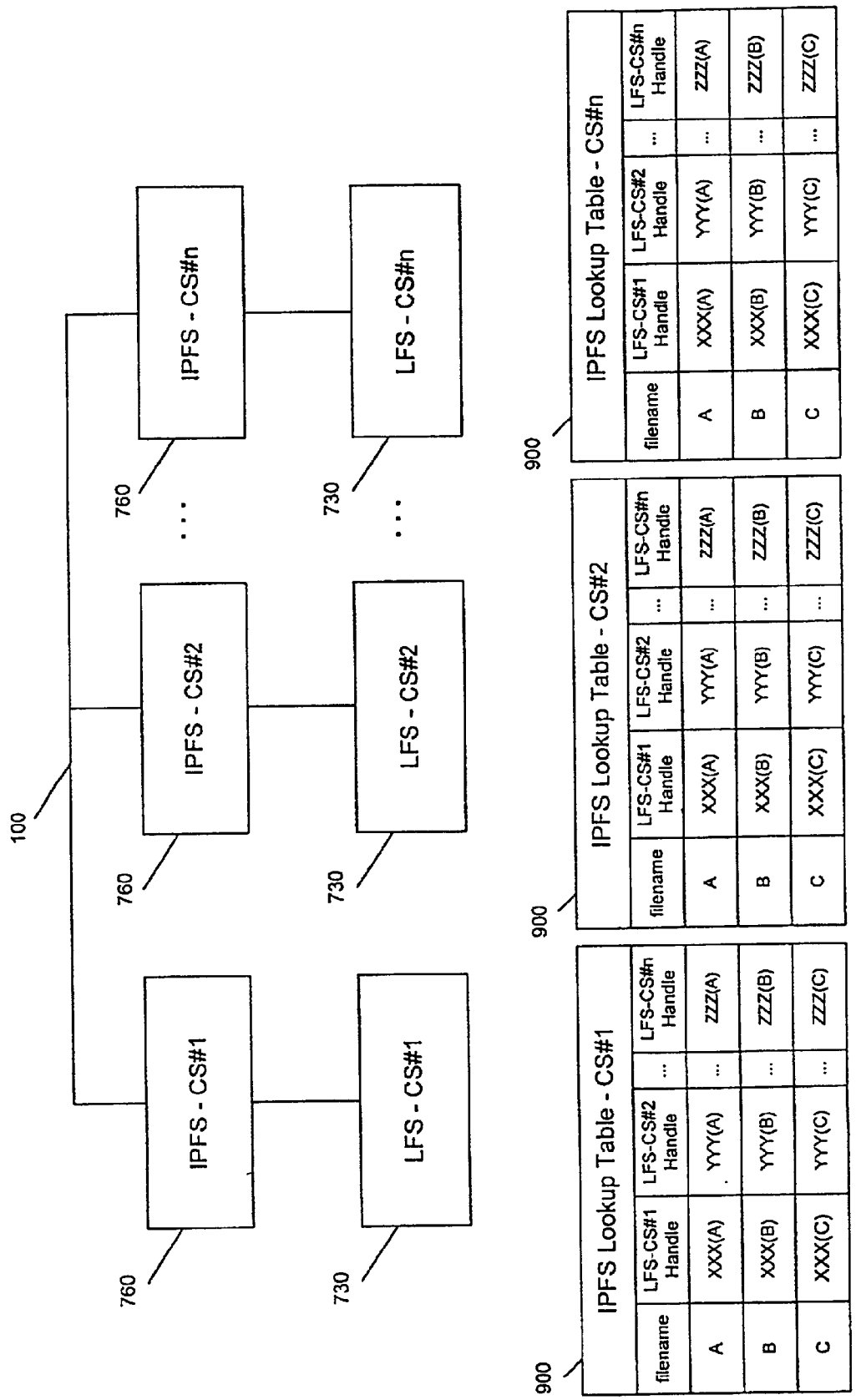
FIG. 27 illustrates a lookup table in accordance with another embodiment of the present invention.

In another embodiment illustrated in FIG. 27, the file handle issued by the LFS of one component server is associated with LFS file handles of the remaining component servers for the corresponding file. In this embodiment, a file handle issued by any component server can be interpreted by any other component server, regardless of the operating systems and storage media used by the individual component servers. In FIG. 27, file A, for example, is associated with LFS file handles XXX(A) from LFS-CS#1, YYY(A) from LFS-CS#2, and ZZZ(A) from LFS-CS#n; the different file handle formats for the local file systems again indicated by XXX(A), YYY(A), and ZZZ(A). Maintaining LFS file handle information for each of the component servers in each lookup table, or a common lookup table, allows any server to issue a file handle at any time, different clients to have handles originating from different servers, and any server to use correctly any handle it receives.

Using the file handle failover of the present invention, transparent failover from one component server to another component server is accomplished while preserving file generation semantics and the ability to detect and repair local file system damage (including deliberate damage such as reformatting or rearranging a disk). Without file handle failover, the failover process typically involves closing all files which most likely means shutting down applications, unmounting the file systems which may require rebooting, remounting the file systems, and reopening all files. Depending on the complexity of the situation, this process can take anywhere from 30 seconds to 5 minutes and can require a great deal of code. Further, the file handle translation techniques of the present invention, while ideal for failover, may also be employed in other situations to include, for example, re-distributing the workload among the servers during periods of increased activity. These and other applications will be known to those of ordinary skill in the art and are within the scope of the present invention.

The IPFS implementation has several advantages. As a file system, IPFS is transparent upwards and downwards. The application makes the same system calls, which are intercepted at the VFS layer and propagated over the network link. Below IPFS, the local file system and disk drivers are not affected, so any advantages in redundancy or performance inherent in the local file system or disk subsystem are preserved. The use of redundant systems, redundant storage and redundant networks means there is no single point of failure. Elimination of a single point of failure creates a new level of flexibility and significantly reduces the need for single point hardening. Together, these lower the cost of deploying redundant application and NFS server systems.

A fourth software component SNMP/ag is an SNMP aggregator that allows an entire system to be managed as a single entity. Typically, while system components are capable of providing system status and control via SNMP, there is still the need to map out the whole system, collect all the MIBs (management information bases), and figure out how to manage all the components. Because SOFTSET knows the configuration of the system and the state of the system, SNMP/ag can provide a simple, comprehensive view to the system manager. The system manager's SNMP browser talks to SNMP/ag, which provides a single MIB for the entire system. SNMP/ag, in turn, talks to all the SNMP agents within the system, and relays requests and instructions.

A fifth software component REDIRECT is a rules-based engine that manages the system based on the input from NETRACK 200 and SNMP/ag. These rules dictate the actions that should be taken if any component fails, and provides methods to migrate services, IP addresses, and other network resources. REDIRECT provides the high-level mechanisms to support N+1 and N+M redundancy without complicated application coding.

An integral part of SOFTSET is the ability to remotely manage all aspects of the system, including both hardware and software status and control. As part of this remote management capability, SOFTSET supports a Java-based GUI that runs on any host and uses a network connection to talk to the system. In one embodiment, this management capability is provided by an interface with the CCPUnet™ hardware monitoring platform manufactured by Continuous Computing Corporation, internal SNMP agents, and other SOFTSET components to provide a complete "one system" view. CCPUnet™, incorporated herein by reference, provides a distributed network approach for managing clusters of compute or I/O nodes. By using CCPUnet™ and its associated software and hardware interfaces, applications can control node power, monitor critical voltages and temperatures, monitor hardware and software alarms, access CPU or I/O controller consoles and have remote CPU reboot and shutdown capabilities.

Figure 11:
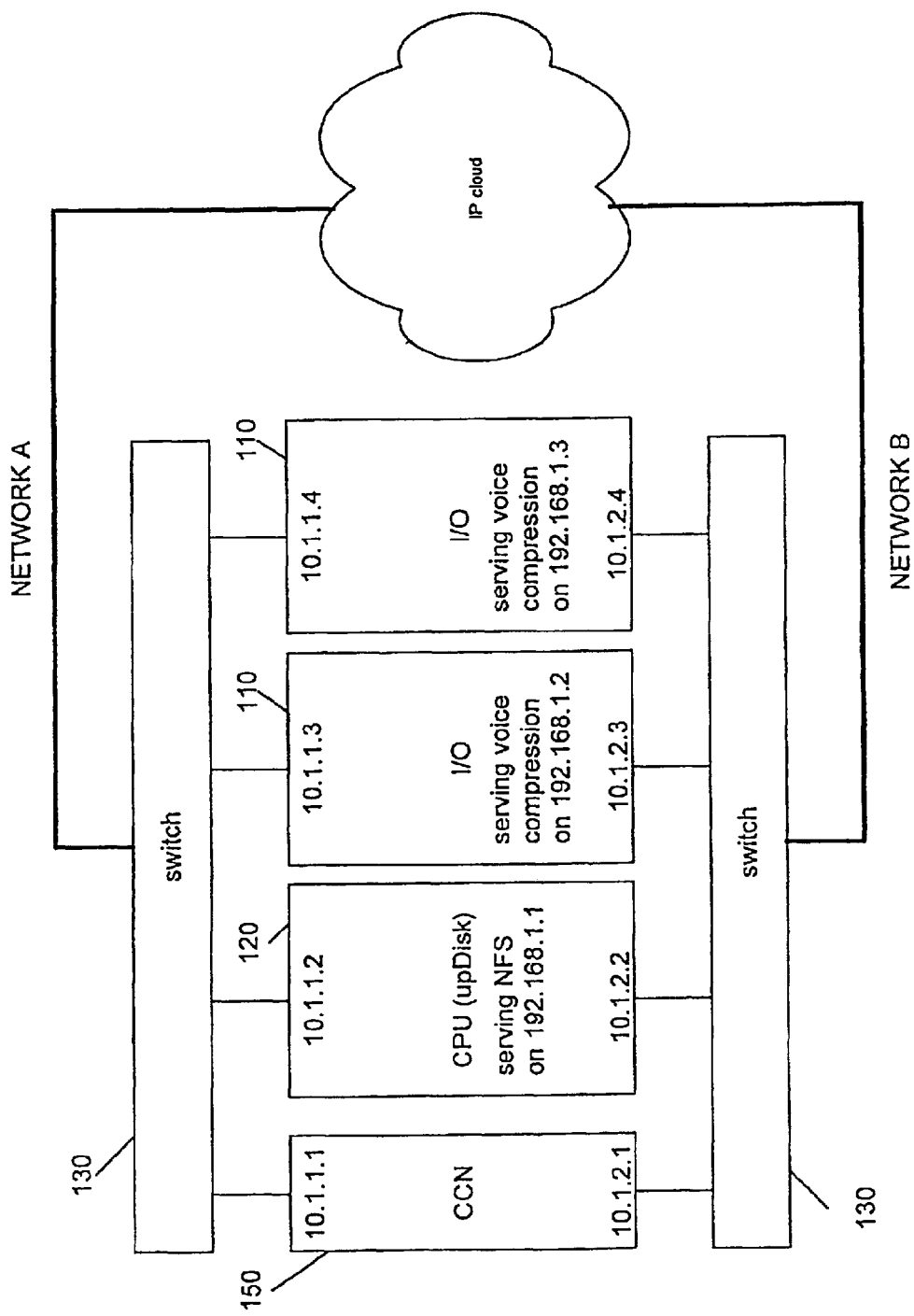
FIG. 11 provides a block diagram illustrating IP addressing in accordance with one embodiment of the present invention.

A further role of SOFTSET is to guarantee that network services (applications) are available to external network clients and to network client software that is inside the system, but which does not talk directly to NETRACK. SOFTSET does this by using 'public' network addresses and by moving those public addresses from component to component as appropriate. As illustrated in FIG. 11, every component in the system has two independent paths to every other component in the system with each interface having a unique private IP address (10.1.x.y), and each active service having a unique public IP address (192.168.1.x). In the context of this discussion, 'private IP' refers to an address known only within the configuration, 'public IP' refers to an address that might be accessed from outside the system, for example, through a router. This designation is different than the common use of 'public IP', which designates an address generally available from the Internet at large. In FIG. 11, an application is providing a network service at 192.168.1.1. Internal to this system, NETRACK tells all the components that the application running at public IP address 192.168.1.1 can be reached via private IP address 10.1.1.2. This allows network clients running on those components to reach the application even if those clients do not talk directly to NETRACK. External to this system, an external router (or routers) relays packets from external clients to 192.168.1.1 via 10.1.1.2.

Figure 12:
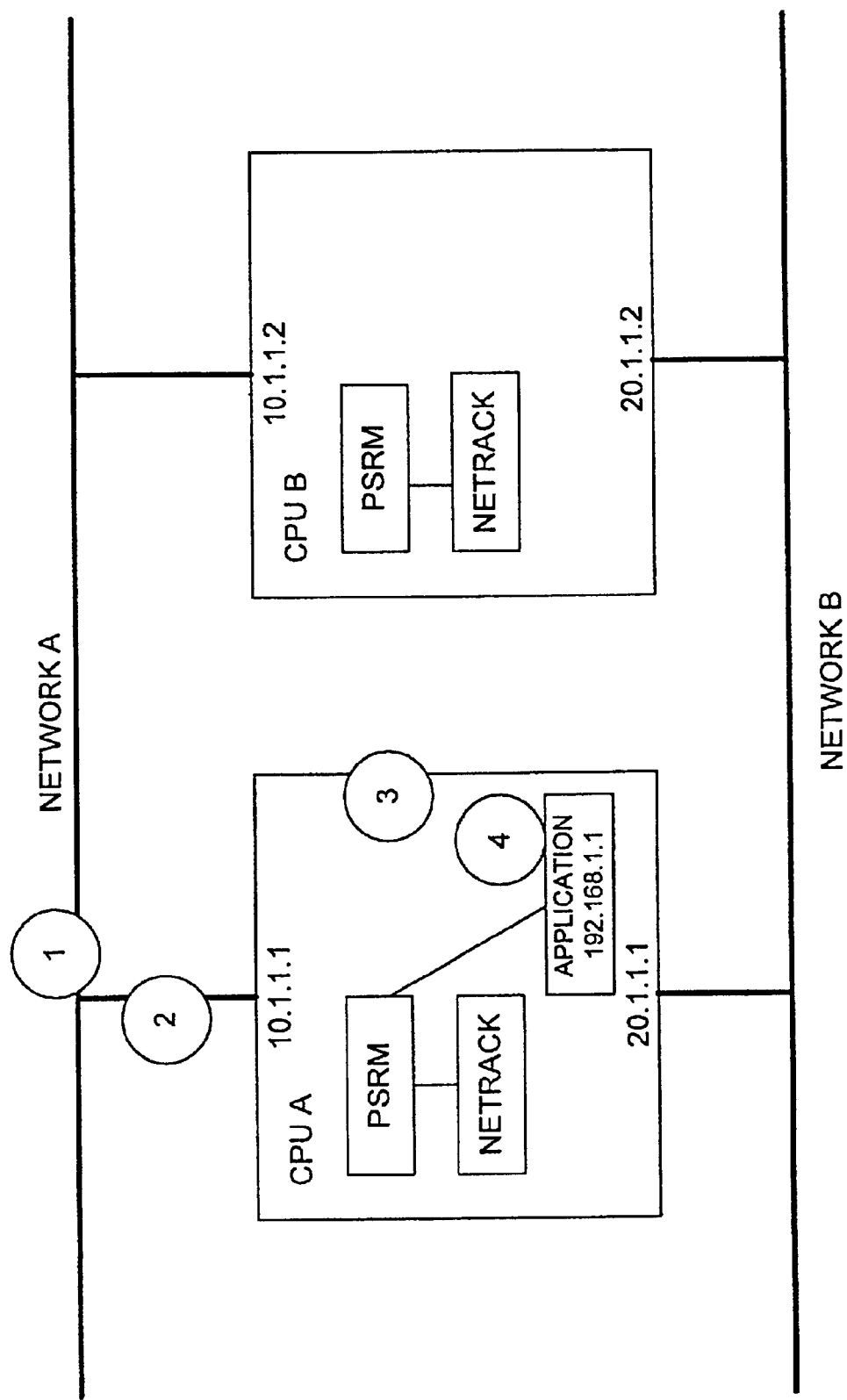
FIG. 12 provides a block diagram illustrating IP failover in accordance with another embodiment of the present invention.

Failover techniques involving the network bus architecture of the present invention depend on the location of the failed component. Within the system, network failures are handled via the redundant links. For example, NETRACK 200 and PSRM 210 on one server can continue communicating with NETRACK 200 and PSRM 210 on another server if an Ethernet port, cable, or even an entire switch fails. For public services (IPMIR 220 on the system controllers, DSP applications on I/O processors, etc.), failover to a second Ethernet port and failover to a standby server are both handled by moving the IP address for that service. The failover actions are dictated by the system configuration and are coordinated by NETRACK 200 and PSRM 210. Further, in some applications, it may be desirable to move the MAC address (physical Ethernet address) to a new port. This requires some care to preserve the private IP addresses in a working state, but is also supported by SOFTSET. Note that when the MAC address is moved packets may be sent through the switch-to-switch link, depending on the capabilities of the router. Four points of failure within one embodiment of the present invention are illustrated in FIG. 12:

network A fails (1), CPU A's link to network A fails (2), CPU A fails (3), and the application on CPU A fails (4).

If network A fails (1) or CPU A's link to network A fails (2), NETRACK tells the other components to reach the application running at 192.168.1.1 through 20.1.1.1. PSRM (or a special process started by PSRM) tells the external router to reach 192.168.1.1 through 20.1.1.1.

If CPU A fails (3), NETRACK on CPU B notices the failure and notifies PSRM. Upon notification, PSRM (or a special process started by PSRM) reconfigures CPU B to use the public address 192.168.1.1 and starts the application on CPU B. NETRACK and PSRM tell the other components and any external routers that 192.168.1.1 is now reachable through 10.1.1.2

Finally, if the application on CPU A fails (4), the two NETRACKs and PSRMs notice the failure. PSRM on CPU A (or a special process started by PSRM) reconfigures CPU A to stop using the public address 192.168.1.1, reconfigures CPU B to use the public address 192.168.1.1, and then starts the application on CPU B. NETRACK and PSRM tell the other components and any external routers that 192.168.1.1 is now reachable through 10.1.1.2

In a further embodiment of the present invention, a unique IP addressing scheme is implemented using the physical location of a board instead of its Ethernet address to determine the IP address of the board at boot time. In this scheme, the IP address remains constant even if the board is replaced. The physical location is determined by mapping the board's current Ethernet address to a physical port on the switch. This physical port number, acting as a geographic ID, is then mapped to the desired IP address by modified DHCP/RARP servers when DHCP/RARP requests are made. To support the IP addressing scheme, the modified DHCP/RARP servers perform a set of SNMP queries to the switch to determine the port number of the requesting client. The Ethernet switch 130 is responsible for automatically learning the hardware ethernet addresses of any computer connected to it, and for maintaining this information in a form that can be queried by outside entities using the SNMP protocol. Once the switch has been queried and the DHCP and RARP servers have determined on which port of the Ethernet switch 130 a given request was received, this information can be used to assign an IP address based on the physical port number of the switch to which the requester is connected. The information can be further mapped to a real geographic location as long as the network wiring topology is known. The modified servers run on the CCN 150, which is the only element in the system with a fixed IP address. Using DHCP/RARP allows the update and maintenance of the IP-to-physical-port table in one place, the CCN.

DHCP (Dynamic Host Configuration Protocol) is a protocol, that allows a network administrator to manage centrally and to automate the assignment of IP addresses to the computers in a network. DHCP dynamically assigns an IP address to a computer when a connection to the Internet is needed. With the enhanced DHCP servers of the present invention, a set of SNMP queries are made to the switch 130 to determine the port number of the requesting client. Flowcharts of the enhanced DHCP server operation are shown in FIGS. 13–14.

Figure 13:
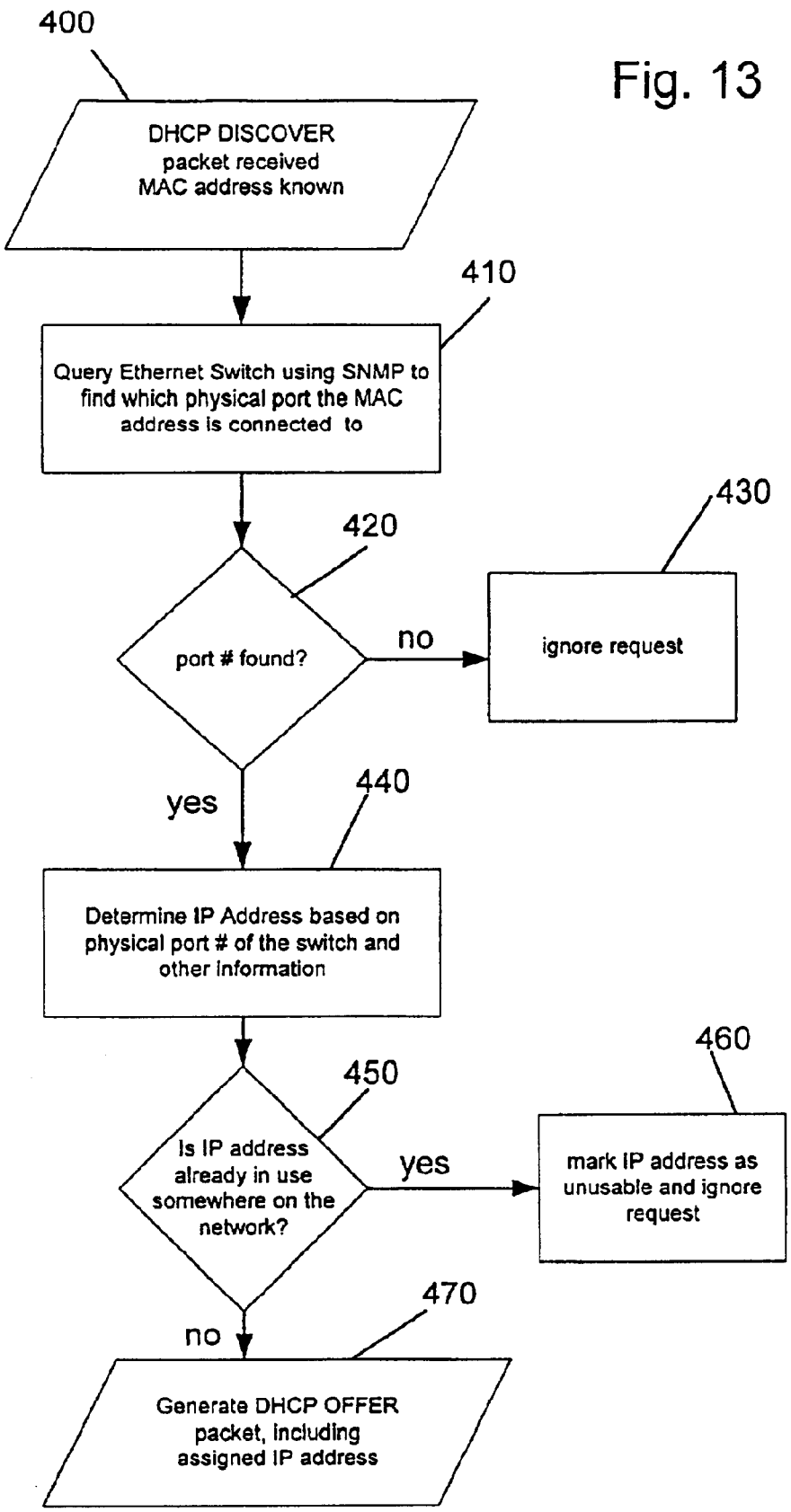
FIGS. 13–14 provide flowcharts of the enhanced DHCP server operation in accordance with an embodiment of the present invention.

Referring to FIG. 13, DHCP server receives a request for internet connection from a device with a MAC address (Media Access Control, i.e, hardware address) known by the DHCP server (step 400). At step 410, the DHCP queries the Ethernet switch 130 to determine the physical port to which the MAC address is connected. If the port number is provided, the IP address is determined from the port information (step 440); otherwise, the request for connection is ignored (step 430). Once the IP address has been determined, the DHCP server checks to ensure that the IP address is not currently in use on the network (step 450). If the IP address is already in use, the DHCP server marks the IP address as unusable and ignores the request for connection (step 460). If the IP address is not in use, the DHCP server assigns the IP address to the requesting device (step 470).

Figure 14:
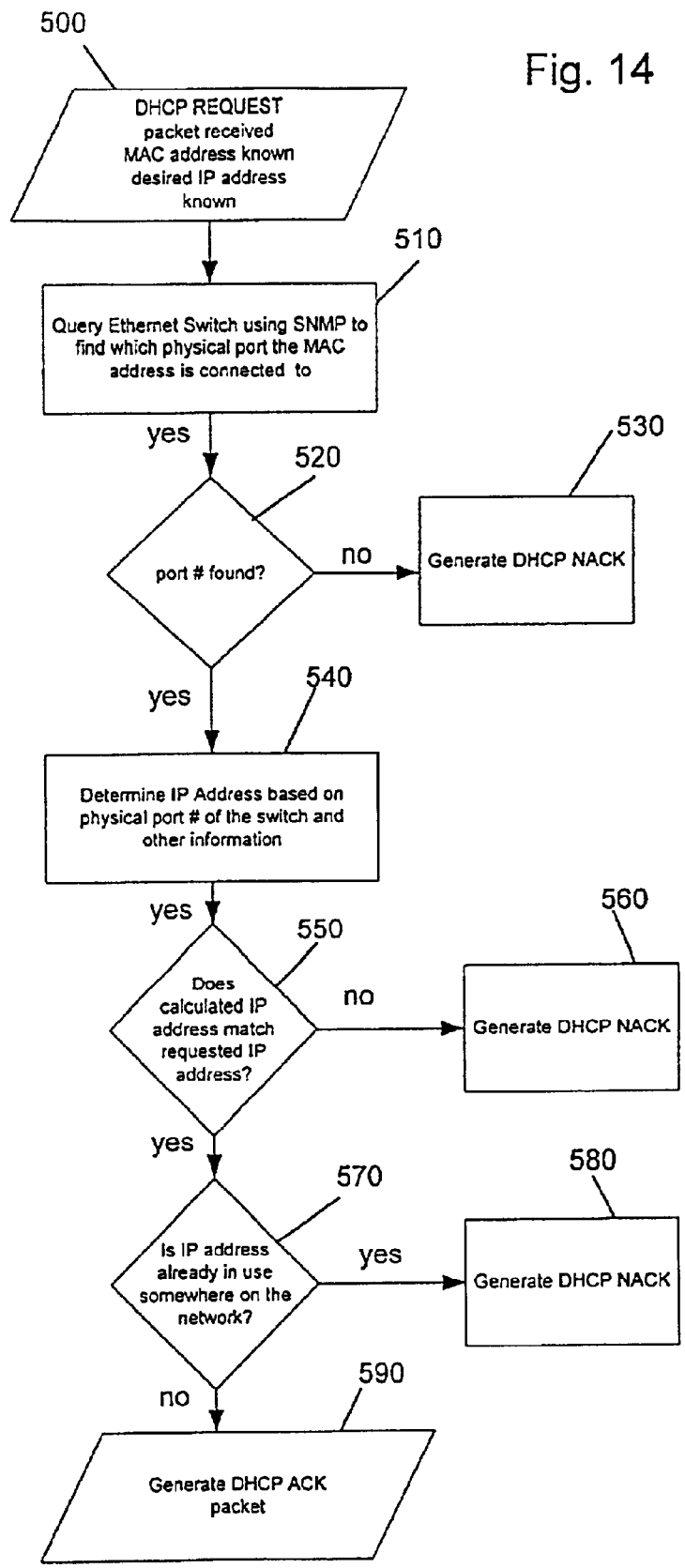

In FIG. 14, the request for connection from the device includes a request for a desired IP address (step 500). At step 510, the DHCP queries the Ethernet switch 130 to determine the physical port to which the MAC address is connected. If the port number is provided, the IP address is determined from the port information (step 540); otherwise, an error message is generated (step 530). Once the IP address has been determined, the DHCP server compares the provided address to the requested address (step 550). If the two addresses do not match, an error message is generated (step 560). If the addresses are the same, a check is made by the DHCP server to ensure that the IP address is not currently in use on the network (step 570). If the IP address is already in use, the DHCP server marks the IP address as unusable and generates an error message (step 580). If the IP address is not in use, the DHCP server assigns the IP address to the requesting device (step 590).

Figure 15:
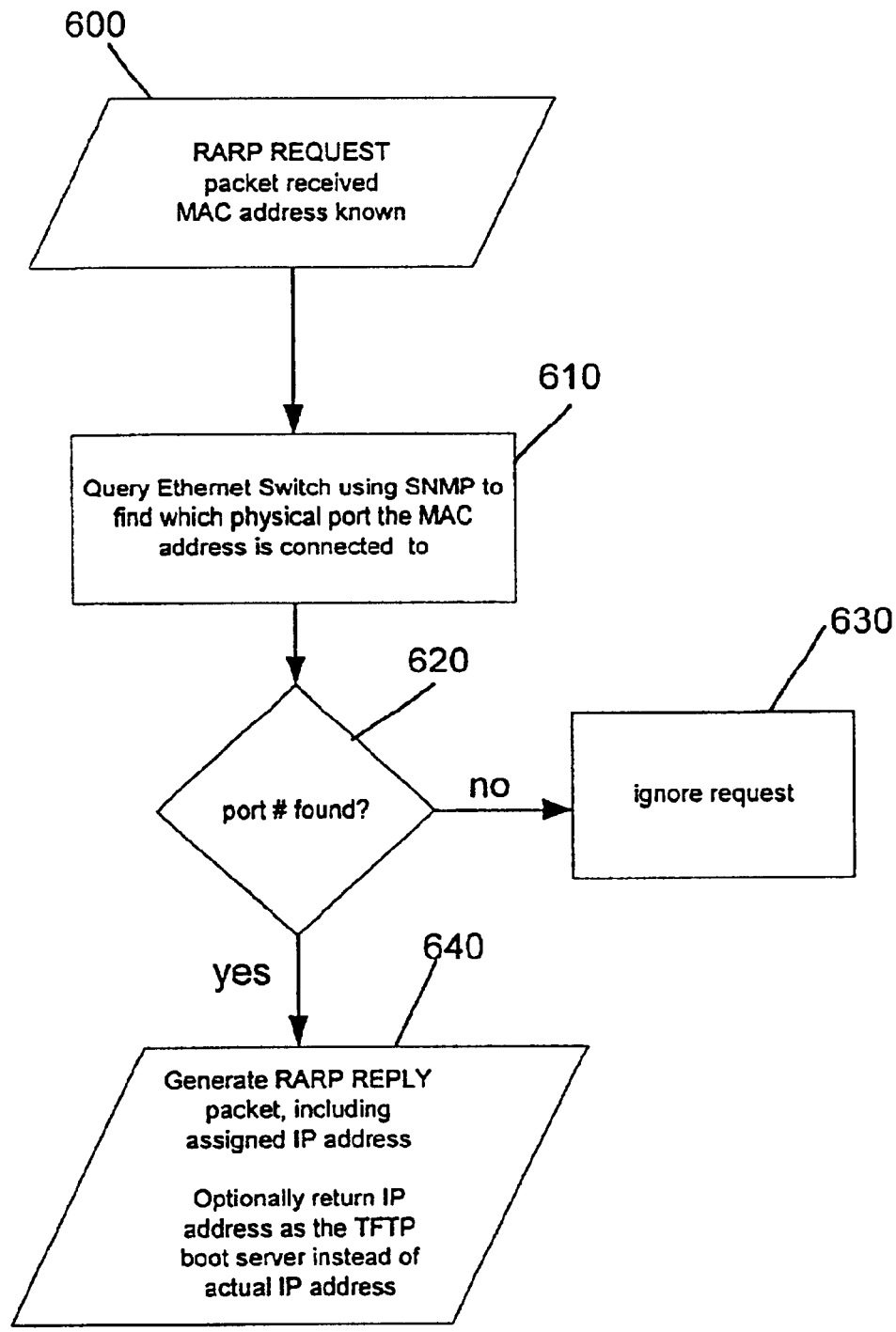
FIG. 15 provides a flowchart of the enhanced RARP server for an embodiment of the present invention.

RARP (Reverse Address Resolution Protocol) is a protocol by which a device can request its IP address maintained in an Address Resolution Protocol (ARP) table typically located in a network router; the table mapping the MAC address of the device to a corresponding IP address. When a device is connected to the network, a client program running on the device requests its IP address from the RARP server on the router. As with the enhanced DHCP server, the enhanced RARP server of the present invention queries the switch 130 to determine the port number of the requesting client. FIG. 15 provides a flowchart of the enhanced RARP server.

As illustrated in FIG. 15, a request is made from a device with a MAC address known to the RARP server (step 600). The RARP server queries the switch 130 to determine the physical port to which the device with the associated MAC address is connected (step 610). If the port is found, the RARP server provides the IP address associated with the port to the requesting device (step 640). If the port information is not found, the RARP server ignores the request (step 630).

Figure 16:
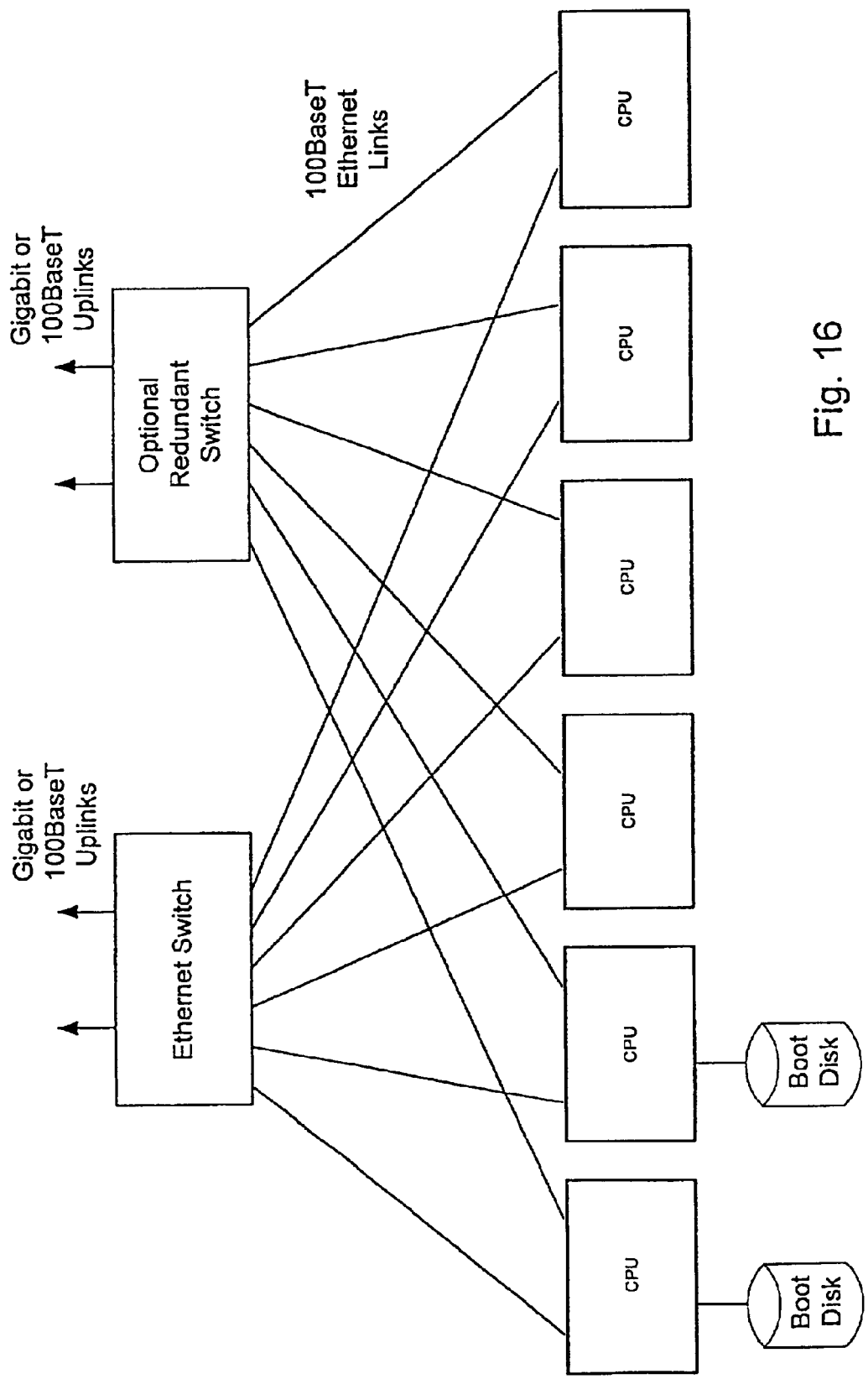
FIG. 16 provides a block diagram of a client-server embodiment of the present invention.
Figure 17:
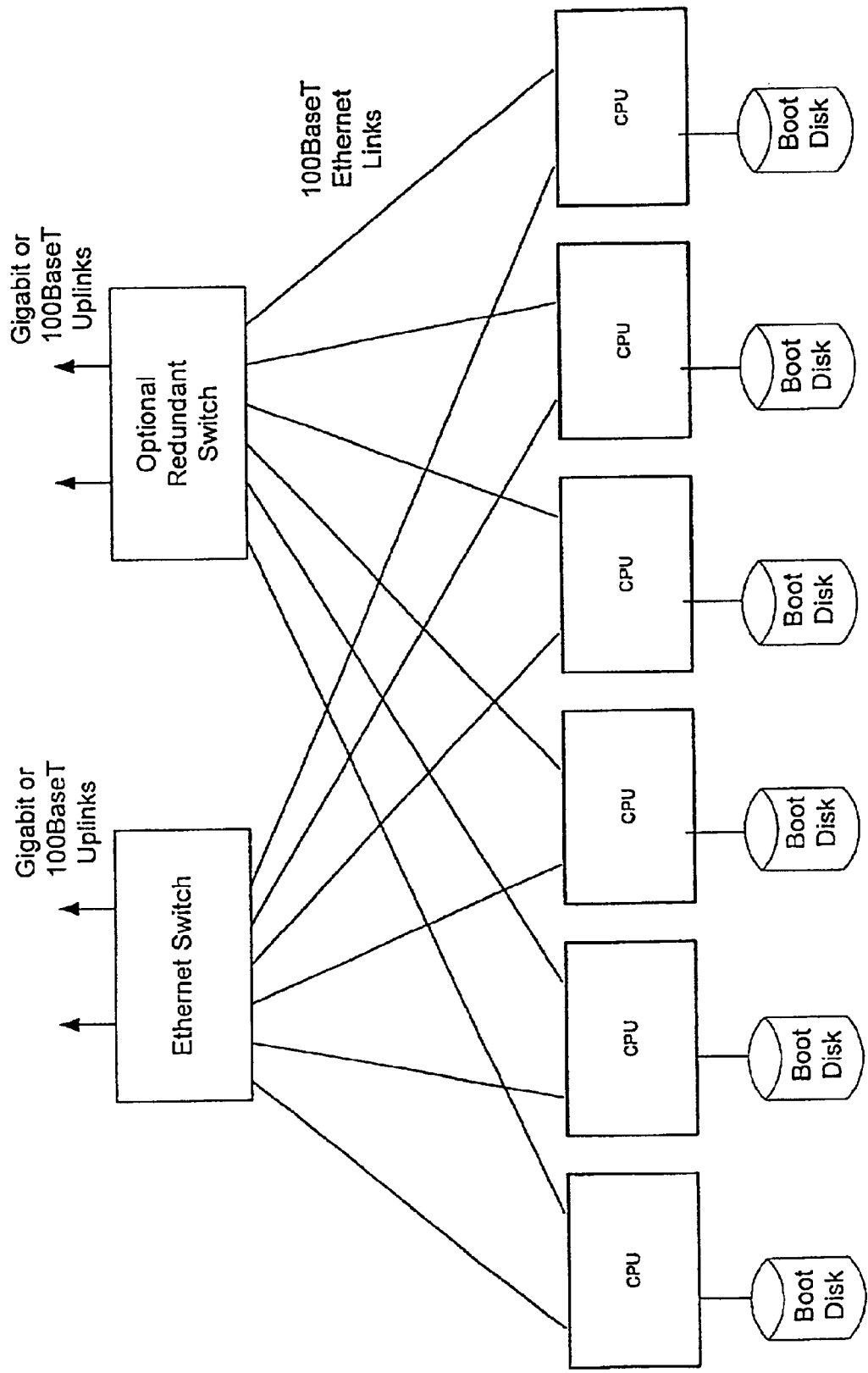
FIG. 17 provides a block diagram of an independent server embodiment of the present invention.
Figure 18:
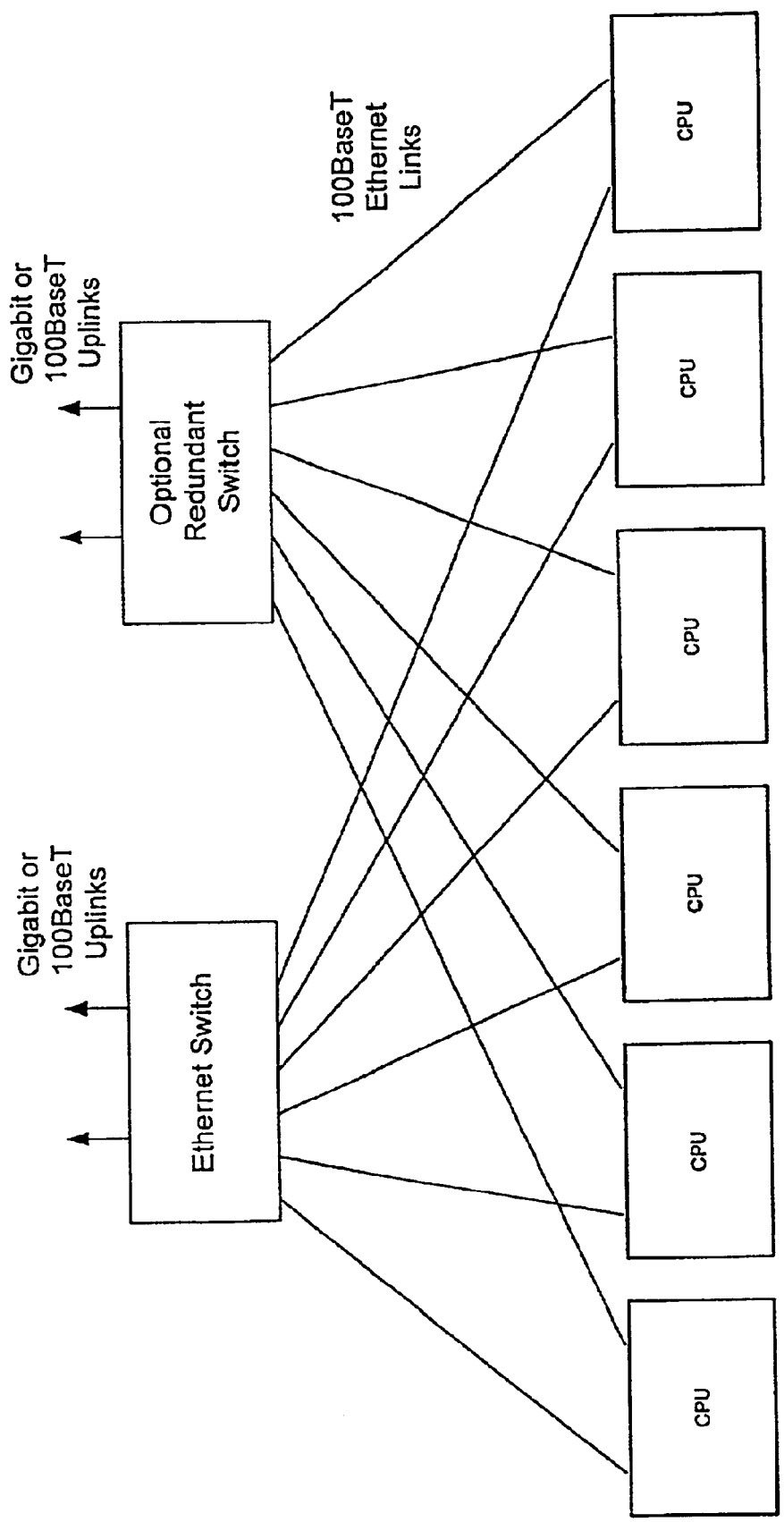
FIG. 18 provides a block diagram of a diskless system embodiment of the present invention.

FIGS. 16–18 respectively illustrate client-server, independent server, and diskless system embodiments of the present invention.

Advantages associated with the network bus architecture of the present invention are numerous. For example, redundant communication is provided by the network bus architecture since each component in the system has two separate paths to every other component. Any single component— even an entire switch—can fail, and the system continues to operate. Moreover, the boards in the system are coupled only by network connections, and therefore should a component fail, the failure is interpreted by the other components as a network failure instead of hardware failure. This interpretation simplifies the programming task associated with failover with more reliable results than in conventional systems. The failure of a network link merely means failover to a second link while the failure of a single component merely means dropped network connections to other components. The system does not experience a hardware failure in the conventional sense. The CPU control nodes, in turn, do not have to run hardened operating systems, but can run rich, popular systems such as Solaris or Linux.

The present invention also leverages the increasing intelligence of available I/O cards. The intelligent I/O processors work largely independent of the system controller, relieving the CPU of having to carry out functions that can be assumed by more peripheral parts of the architecture. While the I/O processors receive services from the controllers (boot image, network disk, configuration management, etc.), I/O is directly to and from the network, instead of over the midplane/backplane from the controller. Much like an object-oriented programming model, this allows I/O processors to present themselves as an encapsulated set of resources available over TCP/IP rather than as a set of device registers to be managed by the CPU.

Further, the actual failover process is simplified. The intelligent I/O processors can continue handling calls even while system controllers are failing over. Both the active and standby system controllers know the system state while intelligent I/O processors tend to know about their own state and can communicate it upon request Failover to the standby component can be handled either by the standby component assuming the network address of the failed component (IP or MAC failover), by coordination among the working components, or by a combination of both. The failure of network components is handled via the redundant ethernet links 130 while communication to equipment outside the system can be handled transparently via IP failover, or by the standby component re-registering with a new IP address (e.g. re-registering with a softswitch). The density of the system is also improved by the inventive network bus architecture since the combination of system controllers, I/O processors, or CPUs is not limited by the chassis. Further, there are no geographical constraints associated with the network bus architecture; embodiments of the present invention can be composed of nodes located on opposite sides of a Central Office space, a building, or even a city to increase redundancy and availability in case of a disaster. The flexibility of a fully-distributed architecture via a network dramatically increases the possibilities for design.

Hot-swap advantages also are provided by a network bus architecture. Replacing failed boards or upgrading boards is simply a matter of swapping the old board out and the new board in. There are no device drivers to shut down or bring back up. Depending on the application, however, it may well be wise to provide support for taking a board out of service and managing power smoothly.

Bandwidth benefits are also available due to the network bus architecture of the present invention. While nominal midplane/backplane bus speeds tend to be higher than nominal network speeds, a fully non-blocking, fill-duplex switch connected in accordance with the present invention can provide higher aggregate throughput. For example, a cPCI bus provides 1 Gbit/sec to a maximum of 8 slots. A full-duplex 100 Mbit ethernet switch provides 1.6 Gbit/sec to an 8 slot system and 4.2 Gbit/sec to a 21 slot system. In a redundant configuration, those numbers could be as high as 3.2 and 8.4, respectively, although an application would have to allow for reduced throughput in the case of a network component failure.

Further, efficiency within the system is improved by using the inventive IP addressing scheme which allows a specific IP address to be assigned to a specific computer location. This scheme is accomplished using enhanced DHCP and RARP protocol servers to determine the geographic location of any computer requesting an IP address. Once determined, the geographic location is then used to assign a specific IP address to the requestor, the IP address is fixed to that particular location, and independent of all hardware specific ethernet addresses. If computer hardware at one location is replaced with different hardware, or the computer at that location is rebooted, the IP address for that computer remains the same. If computer hardware at one location is moved to another location, a new IP address will be assigned to the hardware based on its new location.

Other embodiments of the invention will be apparent to those skilled in the art from consideration of the specification and practice of the invention disclosed herein. It is intended that the specification and examples herein be considered as exemplary only, with a true scope and spirit of the invention being indicated by the following claims.

What is claimed is:

1. An HA network file server comprising:
   two or more component servers having associated file systems, the file systems having no requirements as to media, implementation, or location;
   means for keeping data content of the file systems consistent among the component servers;
   means for sharing access to the file systems over a network;

means for redirecting network traffic between the component servers; and, means for implementing file handle translation to allow one or more component servers to service transparently transactions of another component server.

2. An HA network file server comprising:

two or more component servers;

a local file system associated with each of the component servers, the local file system having no requirements as to media, implementation, or location; and a translator for translating a file handle issued from one component server to the local file system of any component server to allow transactions associated with the issuing component server to be serviced transparently by any of the component servers.

3. The server of claim 2 wherein each component server generates local file handles containing a component server ID and local file system information of the component server; and, the component servers coordinate to generate a common file handle to be translated by the translator to allow any component server to identify a corresponding file in its local file system, the common file handle issued for use in client/server transactions.

4. The server of claim 2 wherein the translator maintains data structures that allow a component server to translate a file handle issued from another component server to its own file system information.

5. The server of claim 4 wherein the data structures associate a common file handle with local file handles generated by the local file systems of the component servers for a file, the common file handle used in client/server transactions.

6. The server of claim 5 wherein the common file handle is a generic file handle.

7. The server of claim 5 wherein the common file handle is the local file handle generated by the issuing component server.

8. The server of claim 2 wherein a file handle is translated by the translator in response to a failure of the issuing component server.

9. The server of claim 2 wherein a file handle is translated in response to increased workload to thereby effect a re-distribution of the workload among the component servers.

10. A method of providing high availability and fault tolerance to a server system having two or more component servers with associated file systems, the file systems having no requirements as to media, implementation, or location, the method comprising:

maintaining consistent data content among the file systems associated with the component servers;

sharing access to the file systems over a network;

redirecting network traffic between the component servers; and, implementing file handle translation to allow one or more component servers to service transparently the transactions of a first component server.

11. The method of claim 10 wherein implementing file handle translation comprises:

maintaining a data structure to allow any component server to associate a file handle issued by any other component server with the correct file in its own file system.

12. The method of claim 11 wherein implementing file handle translation further comprises:

using the data structure to translate a file handle issued by a first component server to a corresponding file in the file system of a second component server.

13. The method of claim 12 wherein using the data structure comprises:

associating a generic file handle with local file handles from the file systems of the component servers, the generic file handle issued for use in the associated transactions.

14. The method of claim 12 wherein using the data structure comprises:

associating the local file handles from the file systems of the component servers for a file, the local file handle of the first component server issued for use in associated client/server transactions.

15. The method of claim 12 wherein the first component server may be any component server.

16. The method of claim 10 wherein implementing file handle translation occurs in response to increased workload to allow the other component servers to service the associated transactions, thereby effecting transparent workload re-distribution among the component servers.

17. The method of claim 10 wherein implementing file handle translation occurs in response to the failure of the first component server, thereby effecting transparent file handle failover.

18. A method of providing high availability and fault tolerance to a network server system having two or more component servers with associated file systems, the file systems having no requirements as to media, implementation, or location, the method comprising:

issuing a file handle from a first component server, translating the file handle to the file system(s) of one or more other component servers to allow the other component server(s) to service transparently the associated transactions.

19. The method of claim 18 further comprising:

maintaining a data structure for translating the file handle to the file systems of the component servers.

20. The method of claim 18 wherein issuing a file handle from a first component server comprises:

generating a local file handle for a file maintained in the file system of a first component server;

coordinating with remaining component servers to generate a common file handle that may be used by any of the component servers to identify the file in the associated file system of the component server;

generating the common file handle; and, returning the common file handle for use in associated transactions.

21. The method of claim 18 wherein translating the file handle occurs in response to the failure of the first component server.

22. The method of claim 20 wherein generating the common file handle comprises one of:

associating a generic file handle with local file handles from the file systems of the component servers, the generic file handle returned for use in the associated transactions; or associating the local file handles from the file systems of the component servers for a file, the local file handle of the first component server returned for use in the associated transactions.

23. The method of claim 22 wherein the first component server may be any of the component servers.

24. The method of claim 23 further comprising:

translating the file handle to the file system of one or more other component servers in response to increased workload to allow the other component servers to service the associated transactions, thereby effecting transparent workload re-distribution among the component servers.

* * * * *